US011541496B2

(12) United States Patent
Kume et al.

(10) Patent No.: US 11,541,496 B2
(45) Date of Patent: Jan. 3, 2023

(54) PORTABLE MACHINING APPARATUS

(71) Applicant: MAKITA CORPORATION, Anjo (JP)

(72) Inventors: Sho Kume, Anjo (JP); Hirotomo Inayoshi, Anjo (JP); Toshiyuki Kani, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/728,435

(22) Filed: Dec. 27, 2019

(65) Prior Publication Data
US 2020/0254576 A1 Aug. 13, 2020

(30) Foreign Application Priority Data

Feb. 8, 2019 (JP) .............................. JP2019-021264

(51) Int. Cl.
*B23Q 9/00* (2006.01)
*B27B 9/02* (2006.01)
*B27B 9/04* (2006.01)
*B23D 45/04* (2006.01)

(52) U.S. Cl.
CPC ........... *B23Q 9/0014* (2013.01); *B23D 45/04* (2013.01); *B27B 9/02* (2013.01); *B27B 9/04* (2013.01)

(58) Field of Classification Search
CPC .............. B23D 45/04; B27B 9/02; B27B 9/04
USPC .................................. 30/376; 403/147, 324
See application file for complete search history.

(56) References Cited

U.S. PATENT DOCUMENTS

| 1,570,730 A | * | 1/1926 | DeLano | B66F 3/14 |
| | | | | 248/354.7 |
| 1,910,651 A | * | 5/1933 | Tautz | B27B 5/265 |
| | | | | 83/477 |
| 3,244,031 A | * | 4/1966 | Mitchell | B23B 45/02 |
| | | | | 408/128 |
| 5,398,709 A | * | 3/1995 | Lee | A45B 25/08 |
| | | | | 403/324 |
| 5,452,515 A | * | 9/1995 | Schilling | B27B 9/02 |
| | | | | 30/376 |

(Continued)

FOREIGN PATENT DOCUMENTS

| EP | 3 360 657 | * | 8/2018 | ............... B27B 9/02 |
| JP | 2007-118230 A | | 5/2007 | |

(Continued)

OTHER PUBLICATIONS

Oct. 4, 2022 Office Action issued in Japanese Patent Application No. 2019-021264.

*Primary Examiner* — Ghassem Alie
(74) *Attorney, Agent, or Firm* — Oliff PLC

(57) ABSTRACT

A portable machining apparatus has high operability in tilting a body with respect to a base or in machining a workpiece with the tilting body. A portable machining apparatus placeable on a long gauge placed on an upper surface of a workpiece includes a base placeable on the long gauge, a body including a blade for machining the workpiece, an angular plate fixed to the base to support the body in a tiltable manner and including a protrusion, a body support located between the body and the base and including a guide engageable with the protrusion to allow sliding of the protrusion on the guide, and a spring that urges the protrusion toward the guide.

16 Claims, 28 Drawing Sheets

(56) References Cited

U.S. PATENT DOCUMENTS

| | | | | |
|---|---|---|---|---|
| 5,570,511 | A | * | 11/1996 | Reich et al. ............... B27B 9/02 30/376 |
| 6,202,311 | B1 | * | 3/2001 | Nickels, Jr. ............... B27B 9/02 30/376 |
| 6,317,929 | B1 | * | 11/2001 | Ring ......................... E05D 1/04 16/355 |
| 8,640,346 | B2 | * | 2/2014 | Allen et al. ............... B27B 9/02 30/376 |
| 2006/0201688 | A1 | | 9/2006 | Jenner et al. |
| 2006/0288590 | A1 | * | 12/2006 | Aoyama et al. .......... B27B 9/02 30/376 |

FOREIGN PATENT DOCUMENTS

| JP | 2011-255502 A | 12/2011 |
|---|---|---|
| WO | 2018/123366 A1 | 7/2018 |

* cited by examiner

PORTABLE MACHINING APPARATUS

CROSS-REFERENCE TO RELATED APPLICATIONS

This application claims the benefit of priority to Japanese Patent Application No. 2019-021264, filed on Feb. 8, 2019, the entire contents of which are hereby incorporated by reference.

BACKGROUND

1. Technical Field

The present invention relates to a portable machining apparatus.

2. Description of the Background

A known portable machining apparatus for machining a workpiece may have a long gauge to be placed on the upper surface of the workpiece and a base to be placed on the upper surface of the long gauge. The portable machining apparatus is, for example, a plunge circular saw. The base supports, in a manner tiltable laterally with respect to a forward cutting direction, a body including a blade for machining a workpiece. The body is moved together with the base in the plane direction of the long gauge, thus cutting the workpiece. In a known portable machining apparatus, the axis of lateral tilt for the body is desirably defined on a lower surface of the long gauge (upper surface of the workpiece) to increase machining accuracy. For machining, however, a physical tilt support shaft cannot be placed on the lower surface of the long gauge, and thus a virtual axis of tilt is to be defined.

Japanese Unexamined Patent Application Publication No. 2007-118230 describes a portable machining apparatus that uses a virtual axis defined on the lower surface of a long gauge as the axis of tilt for its body. An angular plate integral with a base has concentric arc-shaped grooves arranged in two rows. A body support covering the body has concentric arc-shaped ridges arranged in two rows that are engaged with the grooves. The center of the arcs of the grooves and the ridges corresponds to the virtual axis defined on the lower surface of the long gauge. The angular plate and the body support are engaged with and slide on each other to laterally tilt the body with respect to the base about the virtual axis used as the axis of tilt.

BRIEF SUMMARY

The angular plate used in the known portable machining apparatus is formed from a resin. The resin angular plate is typically more easily slidable than, for example, a metal angular plate, but its rigidity is to be improved. In contrast, a metal angular plate having high rigidity is placed to have a clearance from the body support at their positions of abutment to allow sliding between the angular plate and the body support. The clearance causes rattling during the sliding.

One or more aspects of the present invention are directed to a structure with higher operability in tilting a body with respect to a base or in machining a workpiece with the tilting body.

A first aspect of the present invention provides a portable machining apparatus placeable on a long gauge placed on an upper surface of a workpiece, the apparatus including:

a base placeable on the long gauge;

a body including a blade configured to machine the workpiece;

an angular plate fixed to the base to support the body in a tiltable manner, the angular plate including a protrusion;

a body support located between the body and the base, the body support including a guide engageable with the protrusion to allow sliding of the protrusion on the guide; and a spring configured to urge the protrusion toward the guide.

A second aspect of the present invention provides a portable machining apparatus placeable on a long gauge placed on an upper surface of a workpiece, the apparatus including:

a base placeable on the long gauge;

a body including a blade configured to machine the workpiece;

an angular plate fixed to the base to support the body in a tiltable manner, the angular plate including a guide;

a body support located between the body and the base, the body support including a protrusion engageable with the guide to slide on the guide; and a spring configured to urge the protrusion toward the guide.

DETAILED DESCRIPTION

Basic Structure in First Embodiment

Figure 1:
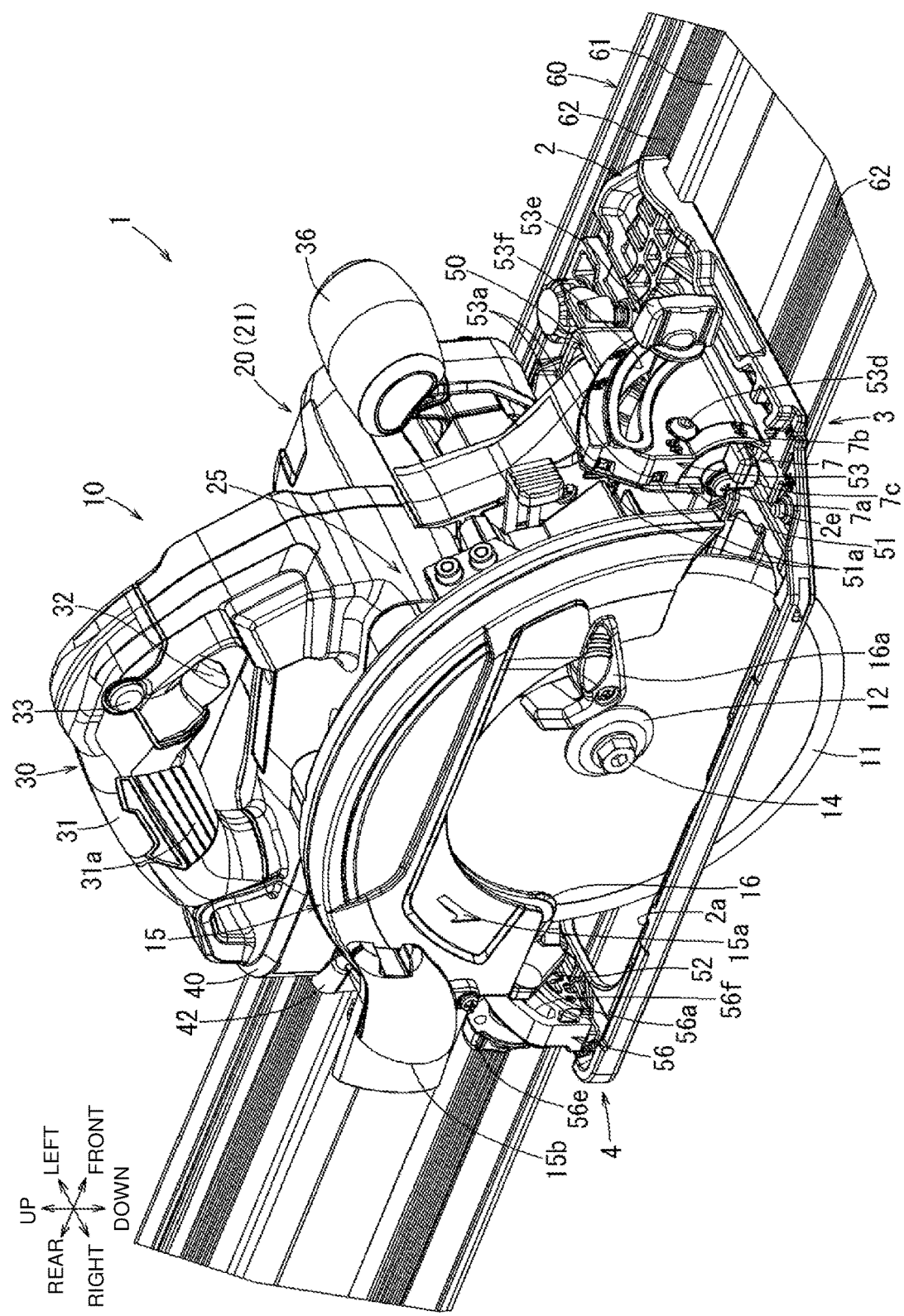
FIG. 1 is an overall perspective view of a portable machining apparatus according to a first embodiment.
Figure 2:
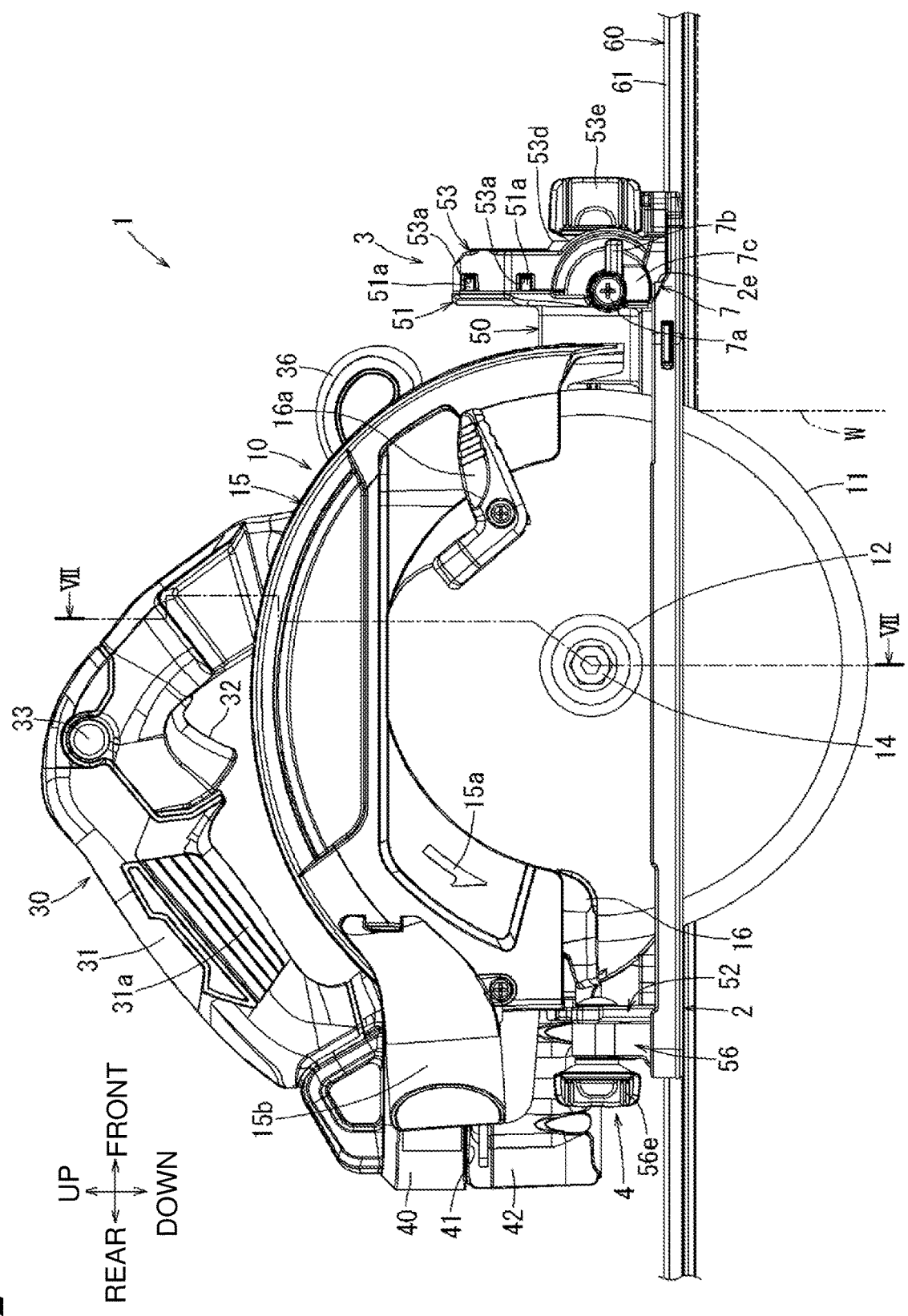
FIG. 2 is a right side view of the portable machining apparatus according to the first embodiment.

A first embodiment will be described with reference to FIGS. 1 to 21. As shown in FIGS. 1 and 2, a portable machining apparatus 1 according to the present embodiment may be a plunge circular saw. The portable machining apparatus 1 includes a base 2 and a body 10. The base 2 is a rectangular flat plate placeable on a workpiece W. A body support 50 (described later) is attached to a lower portion of the body 10. The body 10 is supported on the base 2 via the body support 50. The body 10 rotatably supports a substantially disk-shaped blade 11. A lower portion of the blade 11 protrudes from the lower surface of the base 2 through a window 2a in the base 2. The workpiece W is cut with the blade 11 protruding from the lower surface of the base 2. The body 10 includes a handle 30 gripped by a user. On the left of the portable machining apparatus 1 in FIG. 1, the user grips the handle 30 and moves the handle 30 rightward in FIG. 1 to perform cutting.

Figure 4:
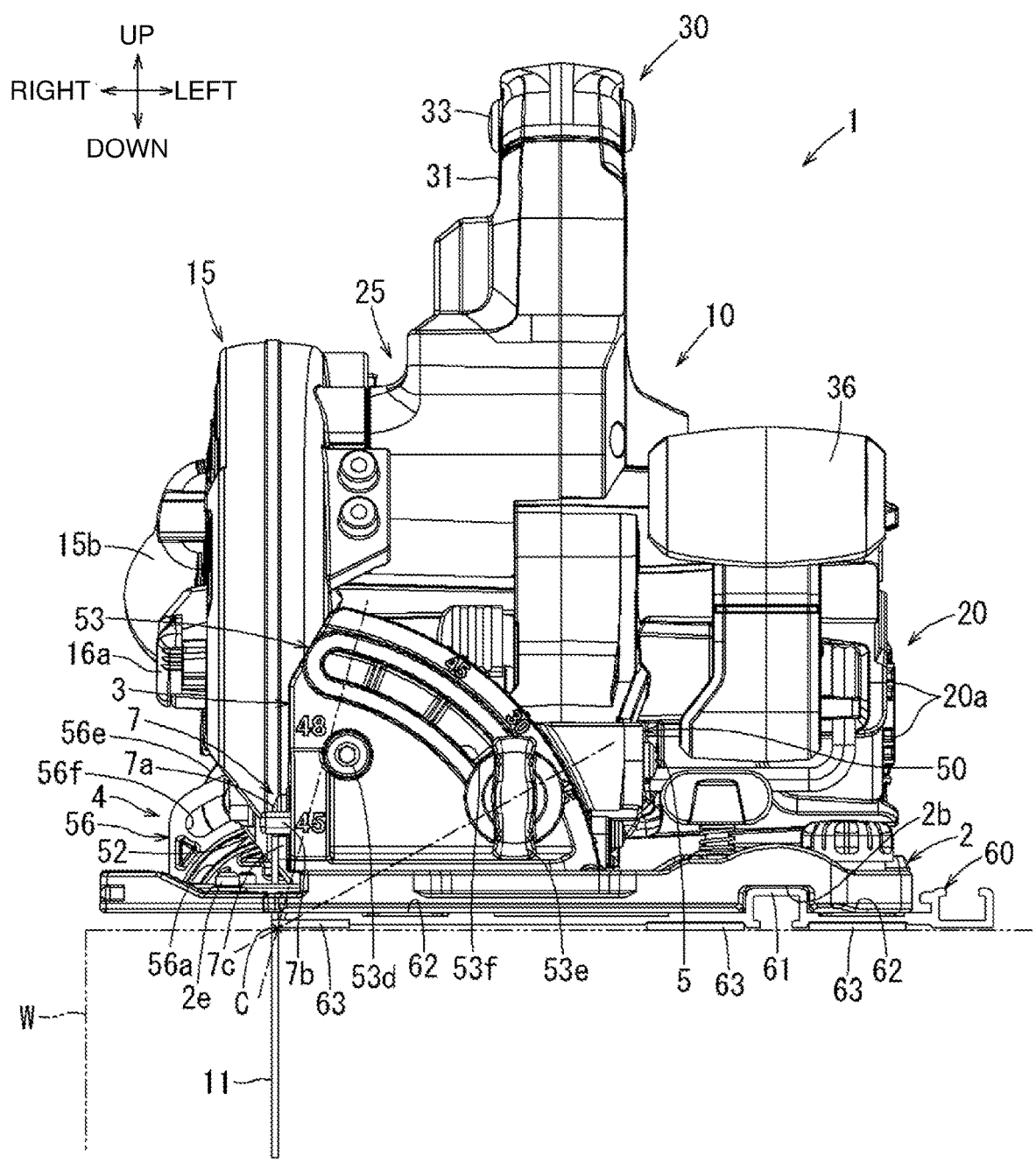
FIG. 4 is a front view of the portable machining apparatus according to the first embodiment.

To machine the workpiece W, as shown in FIGS. 1 and 4, a long gauge 60 is placed on the upper surface of the workpiece W, and the portable machining apparatus 1 is placed on the upper surface of the long gauge 60. The long gauge 60 includes a guide ridge 61 on its upper surface. The guide ridge 61 extends in the longitudinal direction of the long gauge 60. The base 2 includes a guide groove 2b on the lower surface. The guide groove 2b extends in a front-rear direction (forward cutting direction) from the front end to the rear end of the base 2. The guide groove 2b is engageable with the guide ridge 61. The portable machining apparatus 1 is slidable in the longitudinal direction of the long gauge 60 with the guide groove 2b engaged with the guide ridge 61. The long gauge 60 enables quick and accurate cutting of the workpiece W over a long distance. The components and structure will be described herein by referring to the front-rear direction with the front being the direction in which the portable machining apparatus 1 is moved for cutting and the rear being where the user stays. The left-right direction is defined for the components and structure as viewed from the user.

As shown in FIGS. 1 and 2, the body 10 is supported on the upper surface of the base 2 via a front tilting support 3 and a rear tilting support 4. The front tilting support 3 includes a front bracket 51 on the body support 50 and an angular plate 53. The front bracket 51 on the body support 50 is fixed to the body 10. The angular plate 53 is fixed to a front portion of the base 2. The rear tilting support 4 includes a rear bracket 52 on the body support 50 and an angular plate 56. The rear bracket 52 on the body support 50 is fixed to the body 10. The angular plate 56 is fixed to a rear portion of the base 2. The body support 50 and the angular plates 53 and 56 will be described in detail later.

The front tilting support 3 and the rear tilting support 4 have a mechanism for tilting the body 10 with respect to the base 2. The body 10 is supported in a manner laterally tiltable about lateral tilt axes C shown in FIGS. 4 and 5. For example, as shown in FIGS. 8 to 11, the body 10 is tiltable rightward up to about 45°. The lateral tilt axis C of the front tilting support 3 and the lateral tilt axis C of the rear tilting support 4 are coaxial with each other. The lateral tilt axes C are virtual axes, but are not physical members. The body 10 is laterally tiltable to enable tilt cutting with the blade 11 tilting with respect to the lower surface of the base 2.

As shown in FIG. 1, the front tilting support 3 includes a maximum-tilt-angle switching mechanism 7. The maximum-tilt-angle switching mechanism 7 is located on the right of the front bracket 51, and is rotatable about a laterally extending shaft 7a. The maximum-tilt-angle switching mechanism 7 includes an operable member 7b and a base contact portion 7c. The operable member 7b is a lever extending in the radial direction of the shaft 7a. The base contact portion 7c radially stretches from the shaft 7a in a substantial fan shape.

Figure 9:
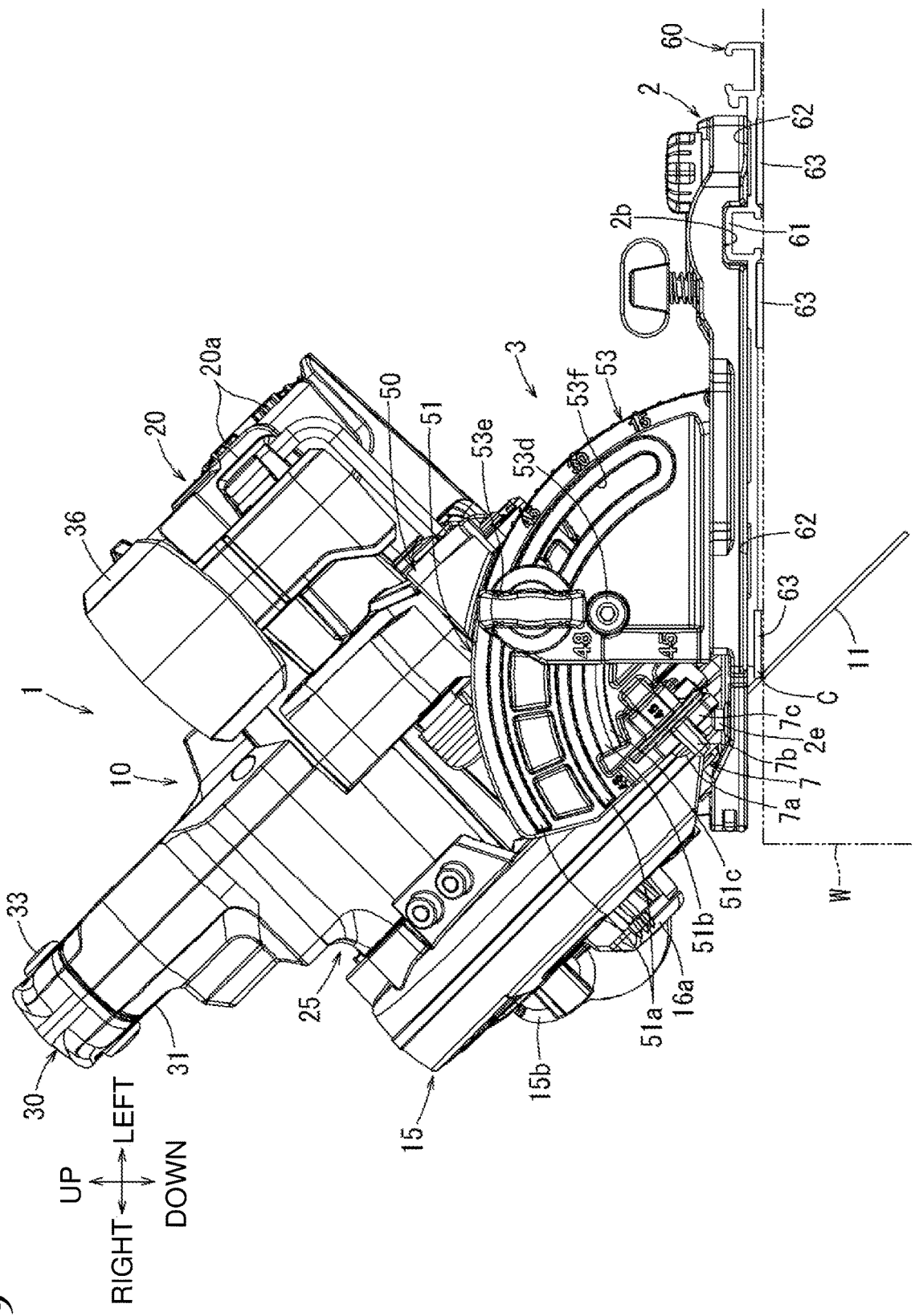
FIG. 9 is a front view of the body tilting 45 degrees rightward.
Figure 10:
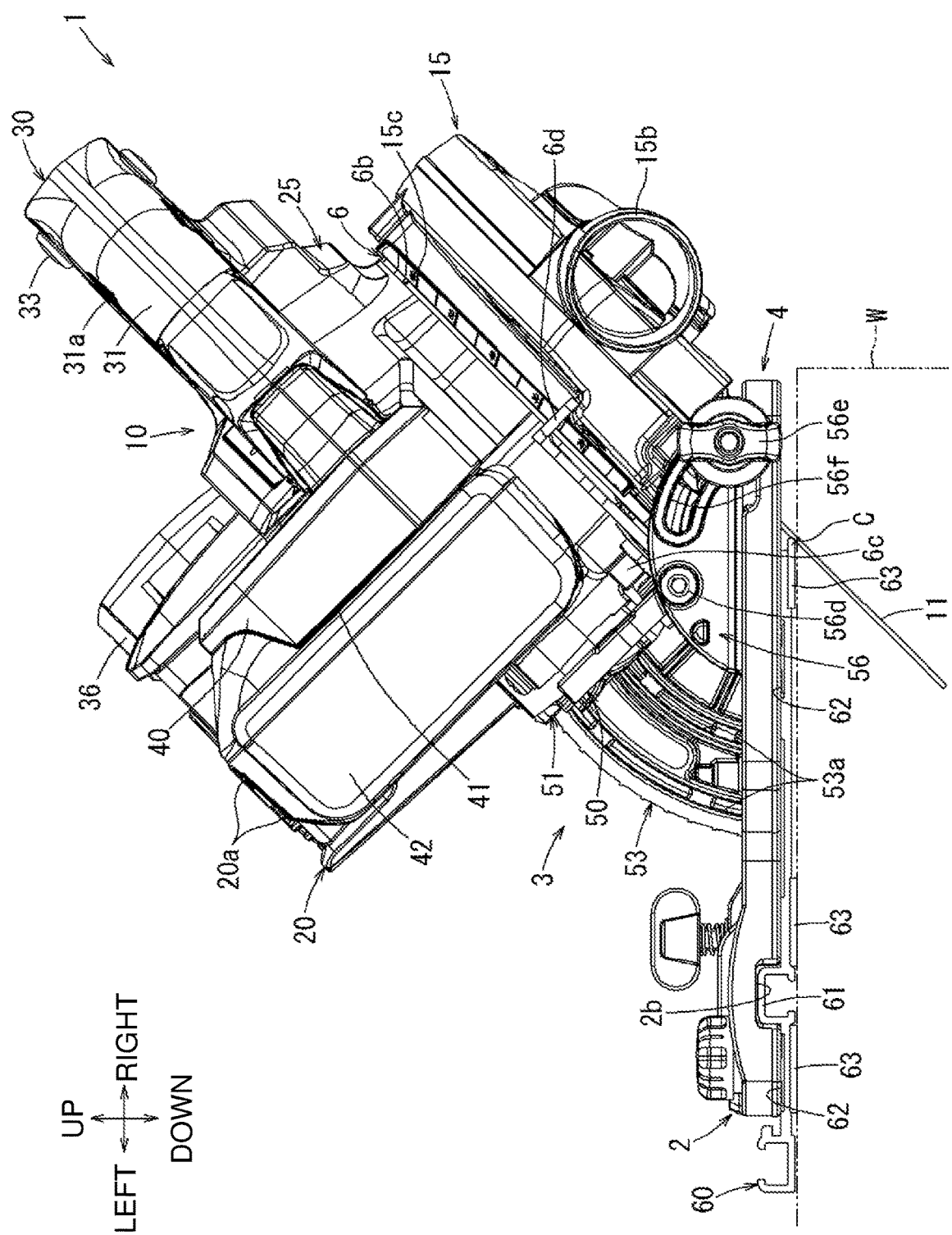
FIG. 10 is a rear view of the body tilting 45 degrees rightward.

As shown in FIG. 2, the base contact portion 7c is located below the shaft 7a when the operable member 7b extends frontward. In this case, as shown in FIG. 9, the body 10 can tilt, for example, rightward to 45° at maximum, until the base contact portion 7c comes in contact with a setscrew 2e, which protrudes from the upper surface of the base 2. When the operable member 7b is rotated upward, the base contact portion 7c is located in front of the shaft 7a. In this case, the body 10 can tilt, for example, rightward to 48° at maximum without the base contact portion 7c coming in contact with the setscrew 2e.

As shown in FIG. 2, the body 10 includes a stationary cover 15. The stationary cover 15 is formed from a metal. The stationary cover 15 covers substantially the upper half of the blade 11. A solid-white arrow 15a on the right side surface of the stationary cover 15 indicates the rotation direction of the blade 11. The stationary cover 15 includes a dust collection nozzle 15b at its rear. The dust collection nozzle 15b is open rearward. The dust collection nozzle 15b is connectable to a separate dust collector through, for example, a hose. The dust collection nozzle 15b can discharge chips resulting from cutting of the workpiece W with the blade 11 from inside the stationary cover 15.

The lower half of the blade 11 shown in FIG. 2 can be substantially covered with a movable cover 16. The movable cover 16 is supported to be open and closed in the circumferential direction of the blade 11, and is urged by a spring in a closing direction (counterclockwise in FIG. 2). When the movable cover 16 is closed under the urging force of the spring, substantially the lower half of the blade 11 is covered with the movable cover 16. When the movable cover 16 is open clockwise in FIG. 2 against the urging force of the spring, a circumferential edge (cutting edge) of the blade 11 is uncovered. In a normal cutting operation, the movable cover 16 is gradually open against the urging force of the spring as the portable machining apparatus 1 is moved forward with the front end of the movable cover 16 in contact with an end of the workpiece W. The movable cover 16 includes an open-close lever 16a on its right side surface. A user can forcibly open and close the movable cover 16 by holding and manually operating the open-close lever 16a.

Figure 3:
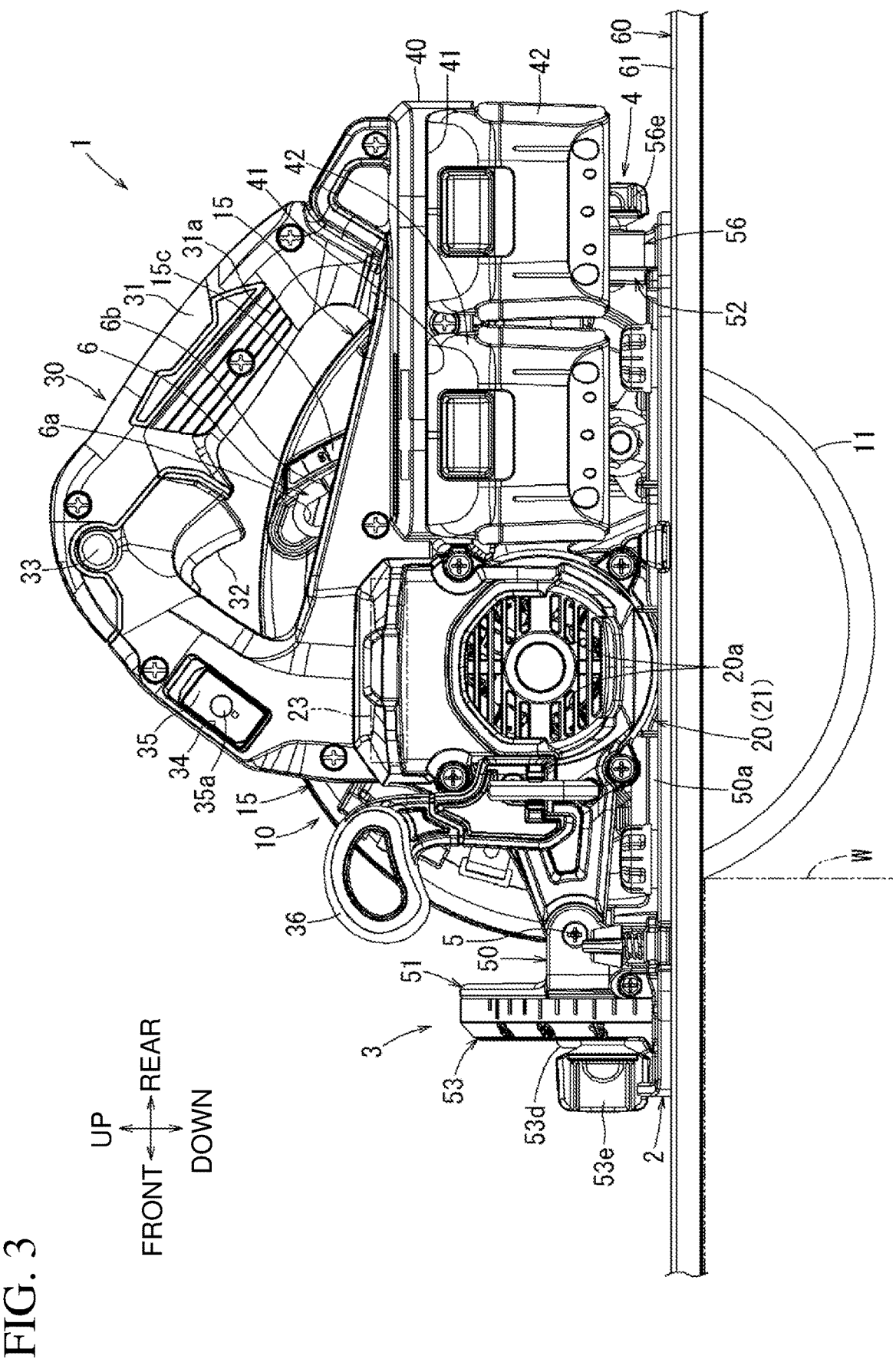
FIG. 3 is a left side view of the portable machining apparatus according to the first embodiment.

As shown in FIG. 3, the body support 50 includes a vertical swing support shaft 5 behind the front tilting support 3. The body 10 is vertically swingable about the vertical swing support shaft 5. The vertical swing position of the body 10 is changed with respect to the base 2 to change the degree by which the blade 11 protrudes from the lower surface of the base 2. This adjusts the depth of a cut in the workpiece W with the blade 11.

Figure 5:
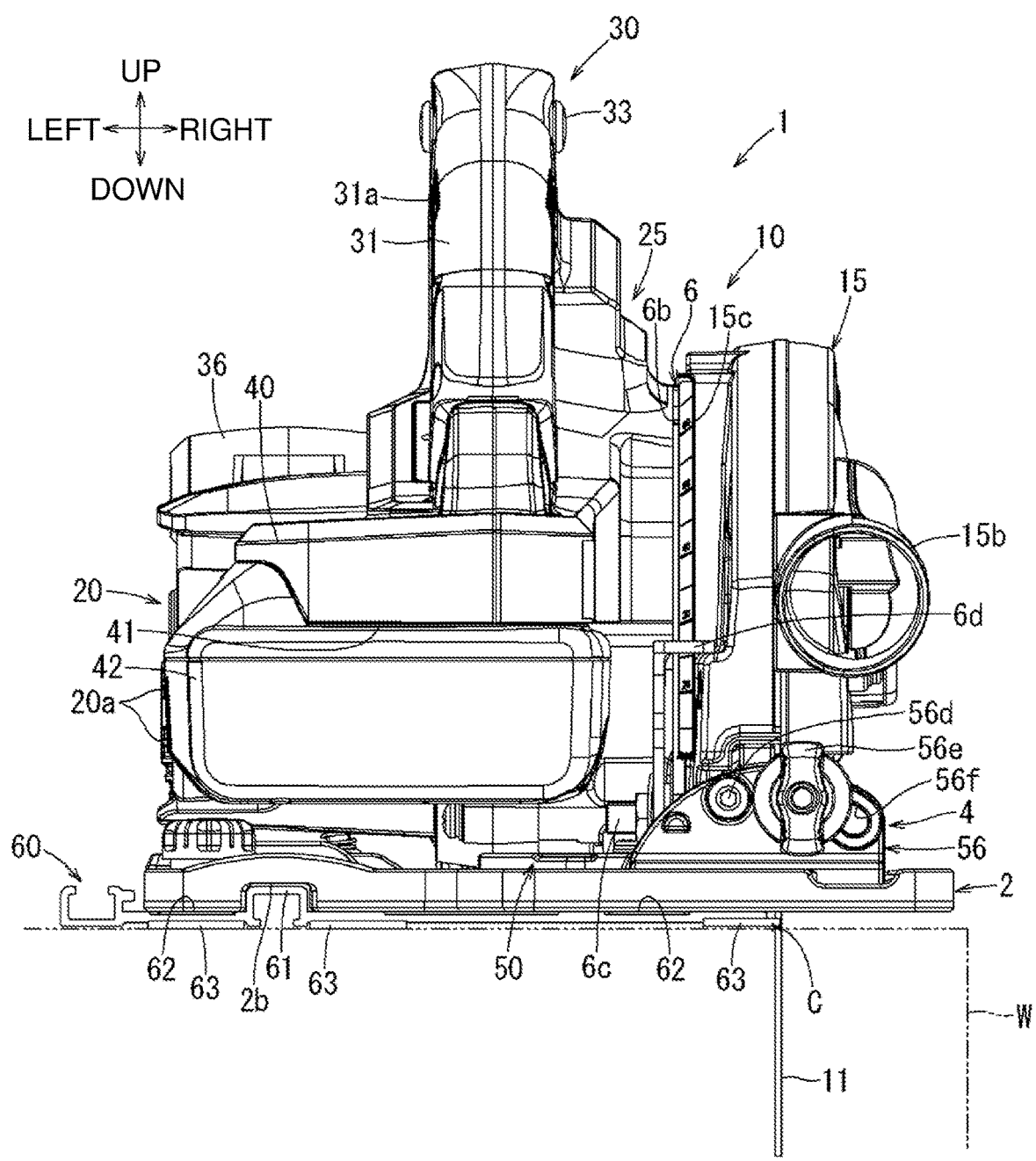
FIG. 5 is a rear view of the portable machining apparatus according to the first embodiment.
Figure 6:
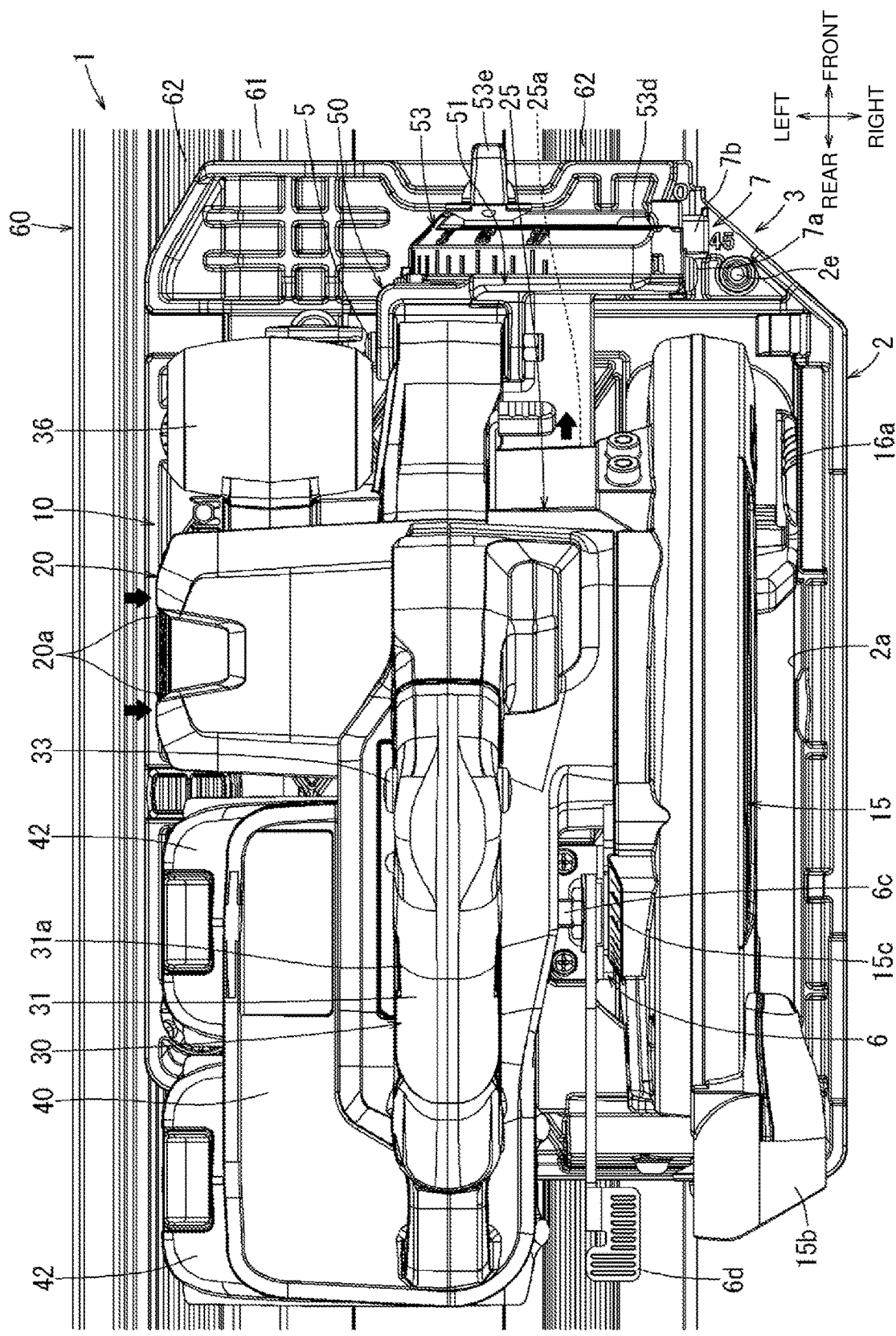
FIG. 6 is a plan view of the portable machining apparatus according to the first embodiment.
Figure 12:
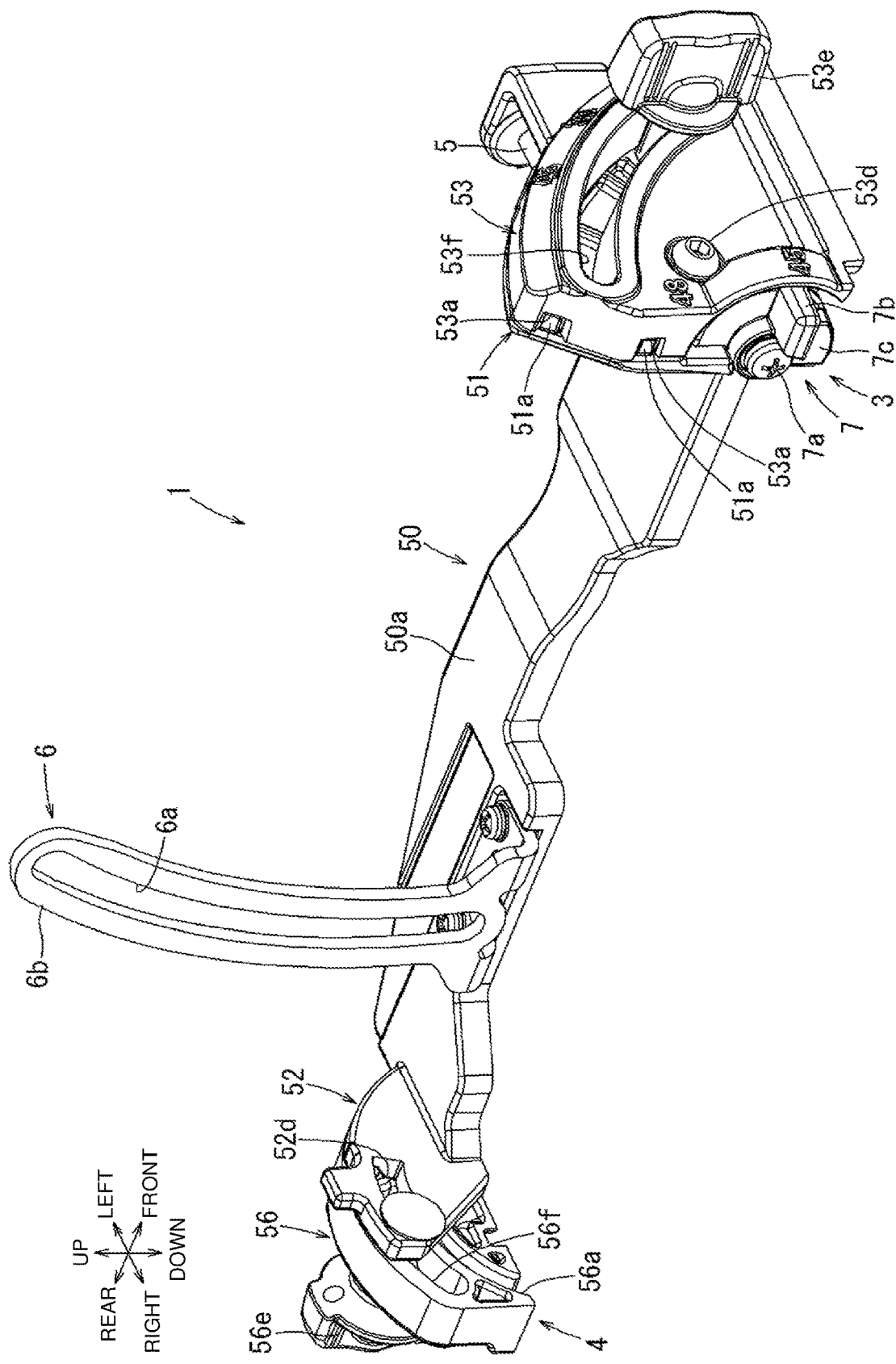
FIG. 12 is a perspective view of an assembly of an angular plate and a body support according to the first embodiment.
Figure 13:
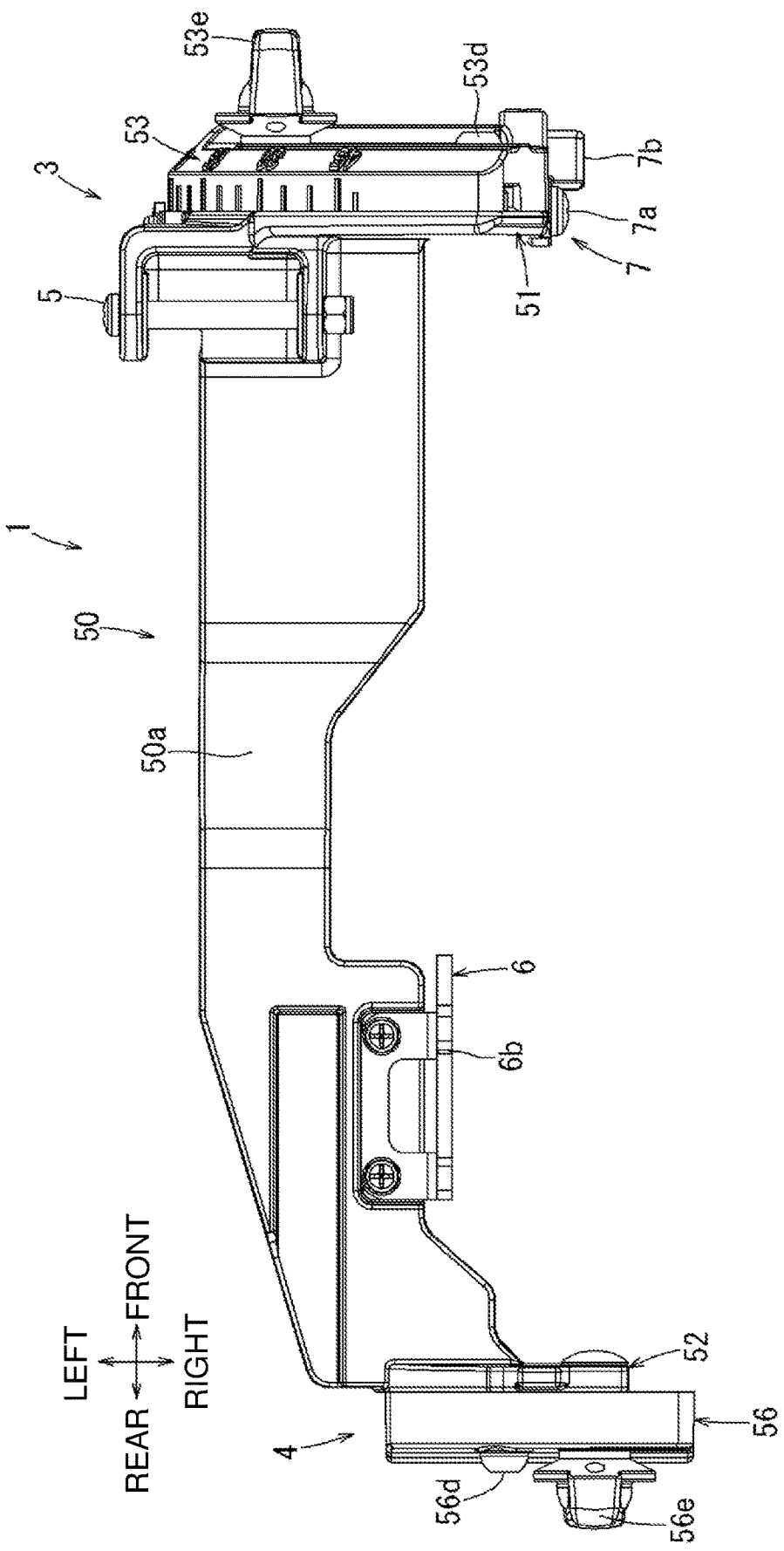
FIG. 13 is a plan view of the assembly of the angular plate and the body support according to the first embodiment.
Figure 16:
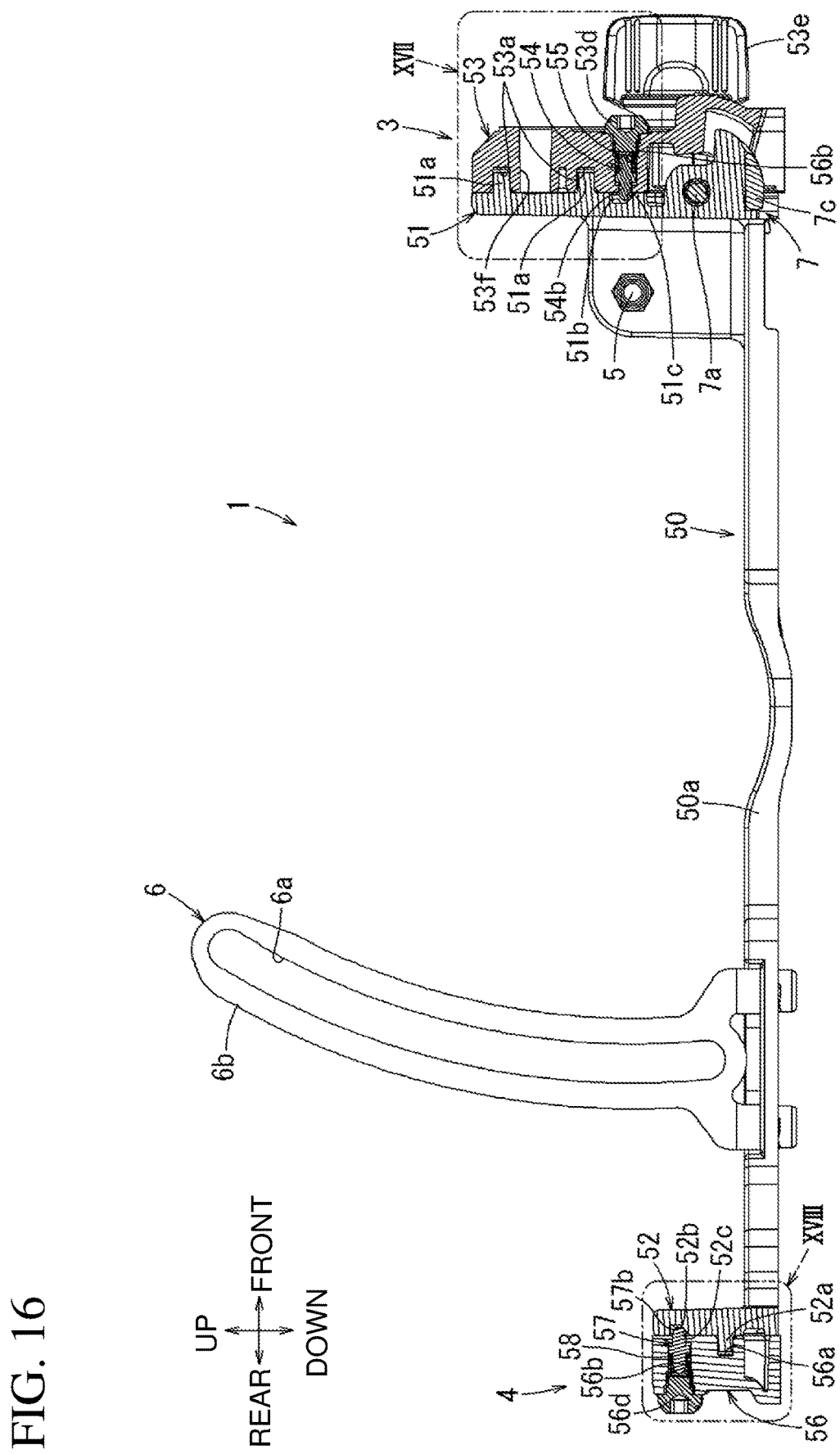
FIG. 16 is a cross-sectional view taken along line XVI-XVI in FIG. 14 or 15, as viewed in the direction indicated by arrows.

As shown in FIGS. 12 and 16, a depth guide 6 for adjusting the cutting depth is attached to a support base 50a extending in the front-rear direction of the body support 50. The depth guide 6 extends in an arc in the circumferential direction of the vertical swing support shaft 5. The depth guide 6 has a bolt guide slot 6a. The bolt guide slot 6a is an arc-shaped long hole that faces laterally and extends along the depth guide 6. As shown in FIGS. 5 and 6, the depth guide 6 is fastened to a portion on the left side surface of the stationary cover 15 with a fixing bolt 6c through the bolt guide slot 6a (refer to FIG. 12). The fixing bolt 6c is loosened when a fixing lever 6d is rotated upward. The fixing bolt 6c is fastened when the fixing lever 6d is rotated downward. The stationary cover 15 has a depth scale 15c with graduations each indicating the cutting depth on its left side surface. The depth guide 6 has a graduation 6b as a groove. The body 10 is vertically swung with the fixing bolt 6c loosened to have a cutting depth indicated by the depth scale 15c vertically aligned with the graduation 6b. The fixing bolt 6c is fastened in this state. The workpiece W is thus cut with the cutting depth indicated by the depth scale 15c.

As shown in FIGS. 4 and 5, a gear housing 25 is located on the left of the stationary cover 15. The gear housing 25 and the stationary cover 15 are integrally formed from a metal material, such as aluminum. A substantially cylindrical motor housing 20 is fastened to the left surface of the gear housing 25 with screws. The motor housing 20 has multiple air inlets 20a on its left side surface.

Figure 7:
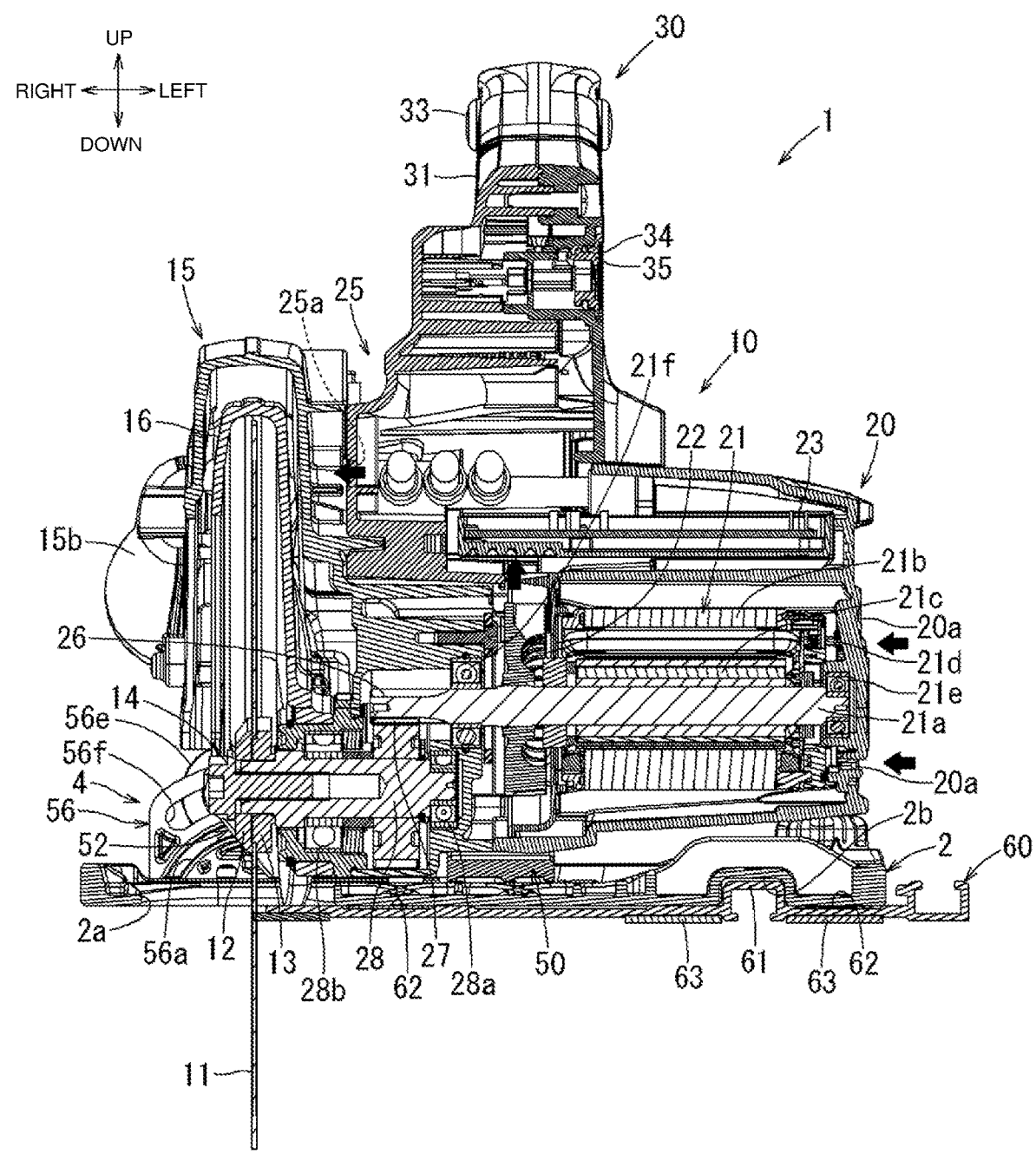
FIG. 7 is a cross-sectional view taken along line VII-VII in FIG. 2, as viewed in the direction indicated by arrows.
Figure 8:
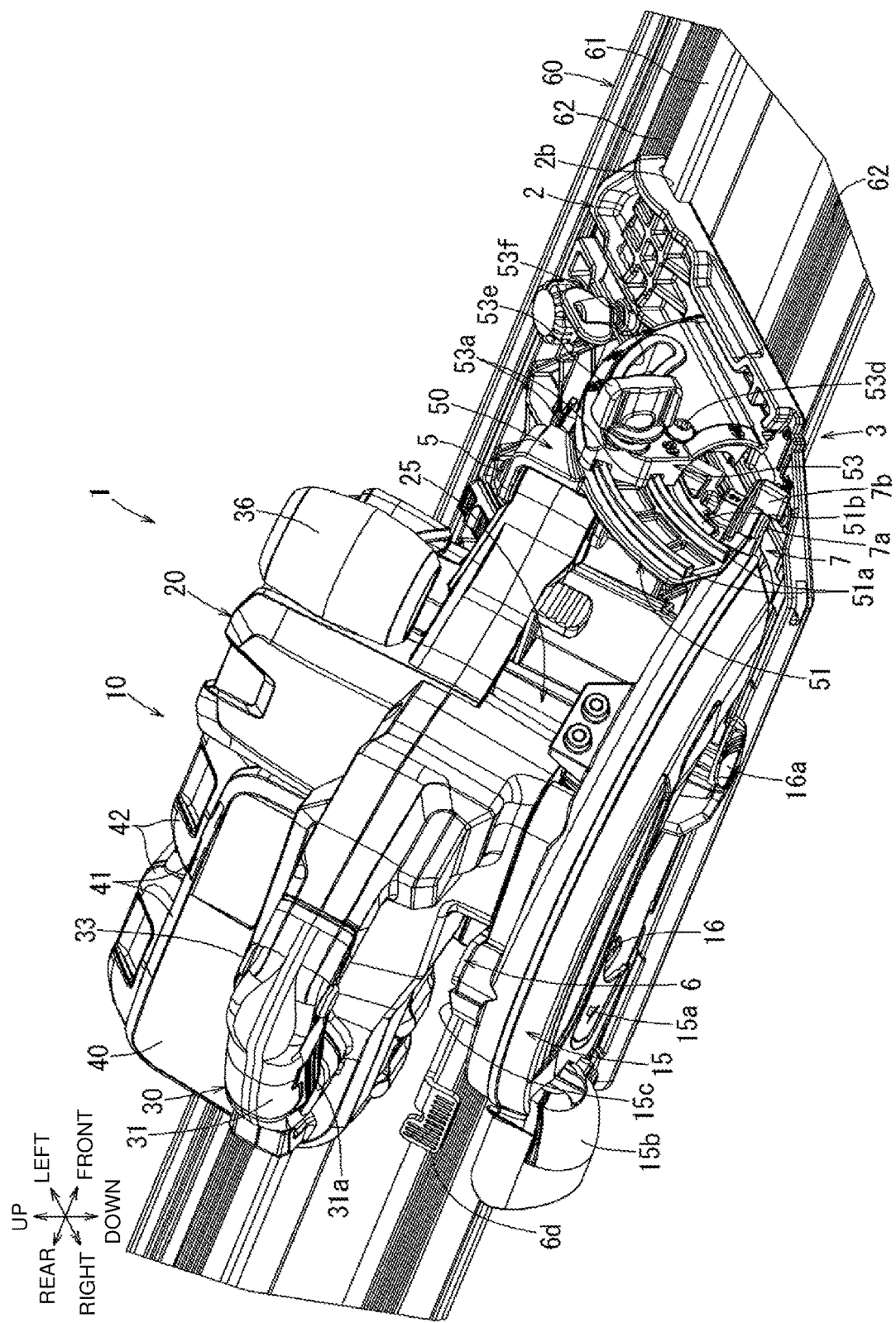
FIG. 8 is an overall perspective view of a body tilting 45 degrees rightward.

As shown in FIG. 7, the motor housing 20 accommodates an electric motor 21, which may be a direct-current (DC) brushless motor. The electric motor 21 includes a motor shaft 21a extending horizontally, or substantially orthogonal to the plane direction of the blade 11. The motor shaft 21a is rotatably supported by the motor housing 20 with bearings 21e and 21f. The electric motor 21 includes a stator 21b supported on the inner circumferential surface of the motor housing 20 in a nonrotatable manner. The electric motor 21 includes a rotor 21c located inward from the inner circumferential surface of the stator 21b. The rotor 21c is mounted on the motor shaft 21a, and is rotatably supported together with the motor shaft 21a with respect to the motor housing 20. The rotation angle of the rotor 21c is detected by a sensor board 21d.

As shown in FIGS. 3 and 7, the motor housing 20 accommodates a controller 23, which is a rectangular flat plate. The controller 23 is located above the electric motor 21 with its longer side extending along the motor shaft 21a and its thickness (shorter side) in the vertical direction. The controller 23 includes a control board accommodated in a shallow case, which is molded with a resin. The controller 23 mainly includes a power circuit and a control circuit for controlling the operation of the electric motor 21. The controller 23 incorporates the control circuit, a drive circuit, an automatic stop circuit, and other circuits. The control circuit is a microcomputer that transmits a control signal based on positional information (rotation angle) about the rotor 21c detected by the sensor board 21d. The drive circuit is a field-effect transistor (FET) that switches a current flowing through the electric motor 21 in response to the control signal received from the control circuit. The automatic stop circuit cuts power supply to the electric motor 21 to prevent overdischarge or overcharge based on the detected status of battery packs 42 (described later).

As shown in FIG. 7, a cooling fan 22 is located on the right of the electric motor 21 to be integrally rotatable with the motor shaft 21a. As indicated with solid-black arrows in FIG. 7, when the electric motor 21 is activated to rotate the cooling fan 22, cooling air is drawn in the motor housing 20 through the air inlets 20a. The cooling air then flows toward the cooling fan 22 on the right. The cooling air flowing in the axial direction toward the cooling fan 22 is redirected outward in the radial direction of the cooling fan 22, and toward the bottom surface of the controller 23 located above. The cooling air flows rightward along the bottom surface of the controller 23, and is discharged through an air outlet 25a (refer to FIGS. 6 and 7) in the gear housing 25. Thus, cooling air cools the electric motor 21, the controller 23, and other components.

As shown in FIG. 7, the gear housing 25 accommodates a driver gear 26 and a driven gear 27 meshing with each other. The driver gear 26 is integral with a right portion of the motor shaft 21a. The driven gear 27 is integral with a spindle 28. The driver gear 26 and the driven gear 27 meshing with each other form a reduction gear train for reducing the rotation output from the electric motor 21. The spindle 28 is rotatably supported by the gear housing 25 with bearings 28a and 28b. The spindle 28 is parallel to the motor shaft 21a. The spindle 28 has a left end that protrudes into the stationary cover 15, onto which the blade 11 is mounted. The blade 11 is held between an outer flange 12 and an inner flange 13 in a direction orthogonal to the plane (lateral direction). With the blade 11 in between, the outer flange 12 and the inner flange 13 are locked with a fixing bolt 14 fastened to the distal end of the spindle 28. Thus, the blade 11 is fastened to the spindle 28 in a manner axially immovable and nonrotatable about the axis.

As shown in FIGS. 3 and 6, a battery base 40 is located on the left of the stationary cover 15 and behind the motor housing 20 and the gear housing 25. The battery base 40 is a substantially flat plate with the thickness direction being the vertical direction. The battery base 40 includes a battery mount 41 on its lower surface. The battery mount 41 can receive two battery packs 42 in parallel in the front-rear direction. The battery packs 42 are versatile, 18-volt lithium ion batteries attachable to a screwing machine or other power tools. When the battery packs 42 are detached from the battery mount 41 and charged with a separate charger, the battery packs 42 can be repeatedly used as power sources. The two battery packs 42 are electrically connected in series, and can feed 36 volts in total to the electric motor 21. Although 18-volt batteries are described by way of example, two 36-volt batteries connected in series may be used instead to output 72 volts.

As shown in FIGS. 1 and 3, the body 10 includes the handle 30 in its upper portion. The front end of the handle 30 is located above the motor housing 20 and the gear housing 25. The handle 30 extends upward and rearward from the front end. The rear end of the handle 30 is connected to an upper portion of the battery base 40. The handle 30 is loop-shaped and extends in the front-rear direction. A rear portion of the handle 30 above the battery base 40 serves as a grip 31 gripped by a user with his or her hand to handle the portable machining apparatus 1. The surface of the grip 31 is covered with a nonslip elastomer resin layer 31a. A front handle 36 at the upper front of the motor housing 20 is integral with the motor housing 20. The user holds the front handle 36 with one hand, and holds the grip 31 with the other hand to move the portable machining apparatus 1.

As shown in FIG. 1, the grip 31 includes a trigger switch lever 32 on the inner circumference of the upper loop. The switch lever 32 is pulled with the fingers holding the grip 31 to activate the electric motor 21, which rotates the blade 11. A lock-off button 33, which is operable by pressing, is located above the switch lever 32. The lock-off button 33 is pressed to unlock the locked switch lever 32 and enable pulling of the switch lever 32. The lock-off button 33 prevents unintended pulling of the switch lever 32. The switch lever 32 is pulled to activate the electric motor 21, which rotates the blade 11.

As shown in FIG. 3, the handle 30 includes an adaptor socket 34 on its front left surface. The adaptor socket 34 can receive a communication adaptor 35. The communication adaptor 35 received in the adaptor socket 34 is electrically connected to the controller 23. With the communication adaptor 35 received in the adaptor socket 34, an adaptor switch 35a on the communication adaptor 35 is pressed to turn on the communication adaptor 35. Thus, the communication adaptor 35 can be wirelessly paired with, for example, a communication adaptor mounted on a separate dust collector to wirelessly link the portable machining apparatus 1 and the dust collector while the communication adaptor is on.

Long Gauge 60

As shown in FIGS. 1 and 4, the long gauge 60 to be placed on the upper surface of the workpiece W includes the guide ridge 61 on its upper surface. The guide ridge 61 extends in the longitudinal direction of the long gauge 60. The guide ridge 61 protrudes upward when viewed in the longitudinal direction (front-rear direction), and has a substantial U shape with substantially right-angled corners. The long gauge 60 includes slide portions 62 on its upper surface. The slide portions 62 extend in the longitudinal direction of the long gauge 60. When the base 2 in the portable machining apparatus 1 placed on the upper surface of the long gauge 60 comes in contact with the slide portions 62, the portable machining apparatus 1 can smoothly slide in the longitudinal direction of the long gauge 60 (front-rear direction). As shown in FIGS. 4 and 5, the long gauge 60 includes nonslip portions 63 on its lower surface. The nonslip portions 63 extend in the longitudinal direction of the long gauge 60. The nonslip portions 63 are formed from, for example, an elastomer resin. The nonslip portions 63 in contact with the workpiece W can prevent the long gauge 60 from moving over the workpiece W.

Body Support 50

Figure 19:
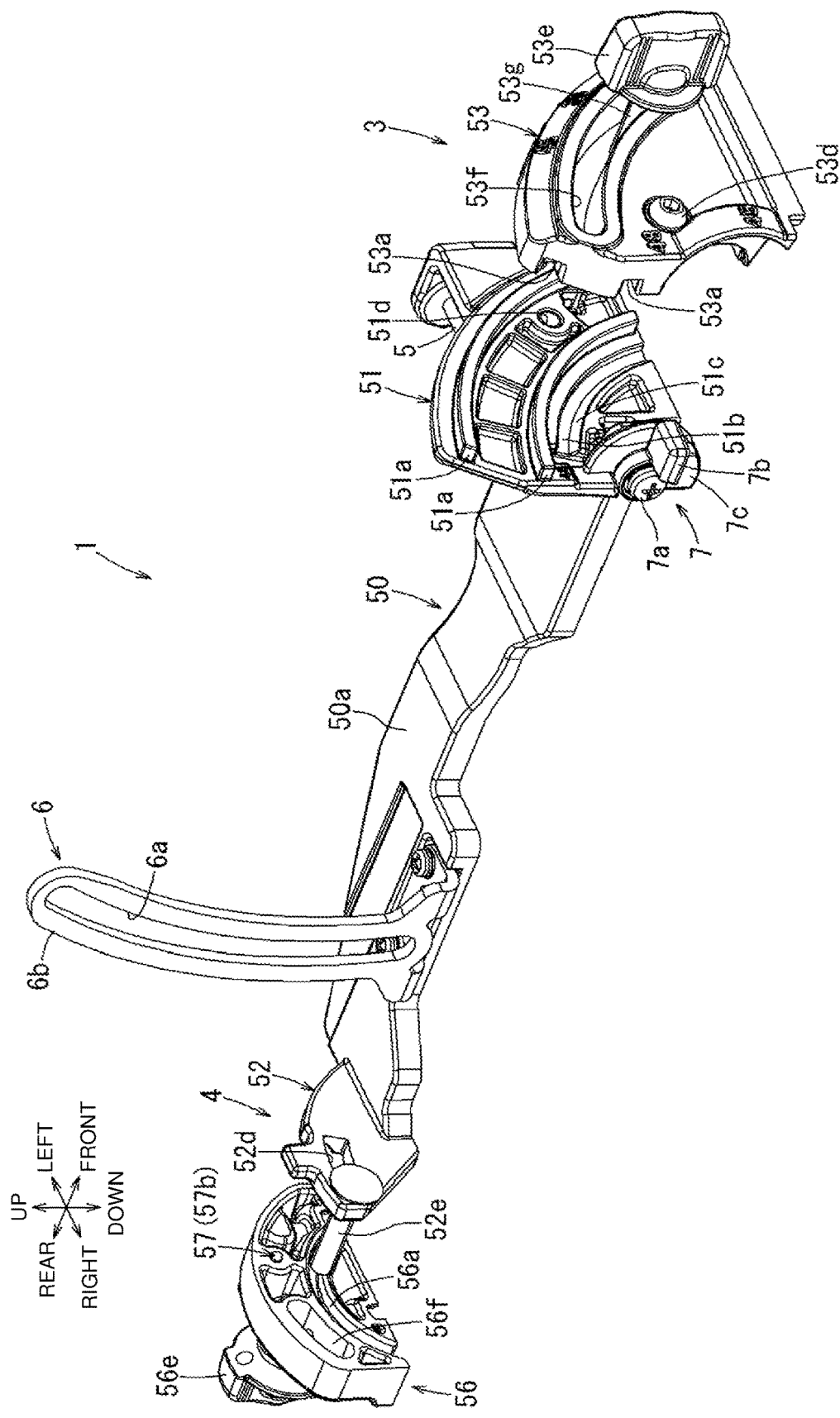
FIG. 19 is an exploded perspective view of the angular plate and the body support according to the first embodiment.

As shown in FIGS. 12 and 19, the body support 50 includes a support base 50a, a front bracket 51, and a rear bracket 52. The support base 50a extends in the front-rear direction. The front bracket 51 is located at the front of the support base 50a. The rear bracket 52 is located at the rear of the support base 50a. The body support 50 is a die-cast member formed from a metal material, such as aluminum. The support base 50a, the front bracket 51, and the rear bracket 52 are integral with one another. The front bracket 51 and the rear bracket 52 have a fan shape stretching upward from the support base 50a. A vertical swing support shaft 5 extends laterally behind the front bracket 51. The depth guide 6 is integrally attached to a rear portion of the support base 50a.

Figure 11:
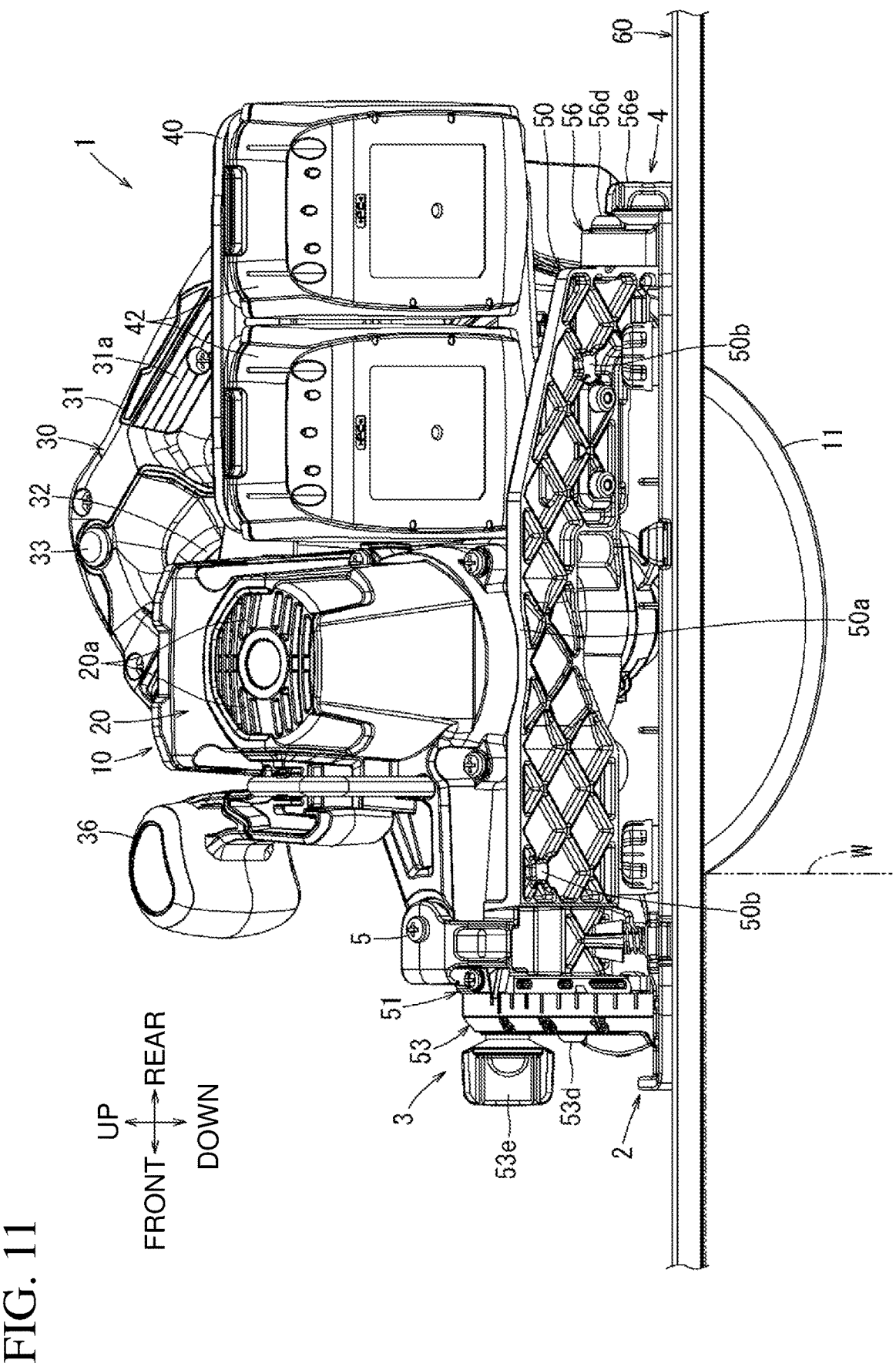
FIG. 11 is a left side view of the body tilting 45 degrees rightward.
Figure 21:
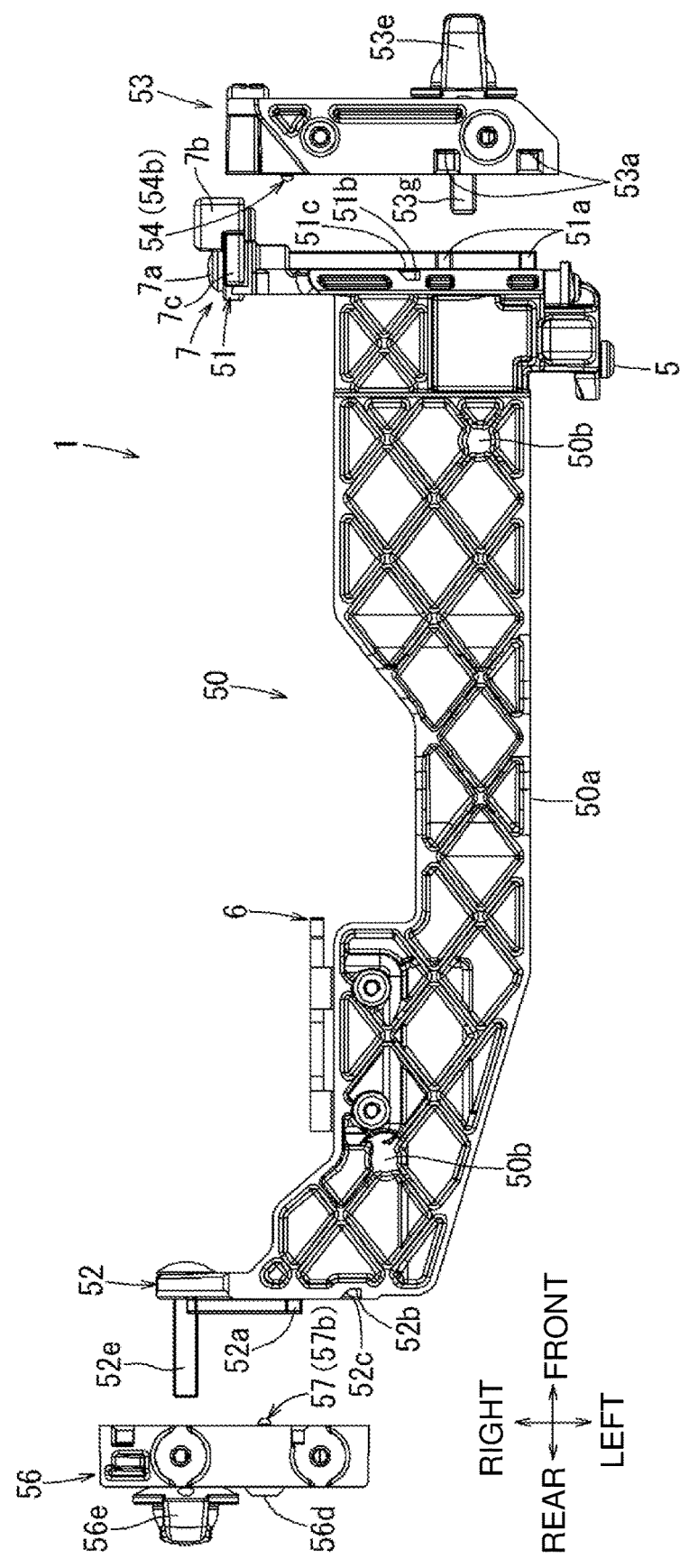
FIG. 21 is an exploded bottom view of the angular plate and the body support according to the first embodiment.

As shown in FIGS. 11 and 21, the support base 50a has two screw contact recesses 50b on its lower surface. Although not specifically shown, external screws protrude upward from the upper surface of the base 2 at positions corresponding to the two screw contact recesses 50b. The external screws are rotated to adjust the length by which the external screws protrude from the upper surface of the base 2. The distal ends of the external screws come in contact with the screw contact recesses 50b when the lateral tilt angle of the body 10 is 0°. Thus, the protruding length of the external screws is adjusted to finely adjust the distance between the base 2 and the support base 50a when the lateral tilt angle of the body 10 is 0°, allowing the body 10 to be horizontal when the lateral tilt angle of the body 10 is 0°.

As shown in FIGS. 17 and 19 to 21, the front bracket 51 includes two ridged rails 51a on its front surface. The ridged rails 51a extend in an arc, and protrude frontward. The two ridged rails 51a are arranged in parallel in an arc with the lateral tilt axis C shown in FIGS. 4 and 9 at the center. The front bracket 51 includes a guide 51b radially inward from the radially inner ridged rail 51a. The guide 51b recedes rearward from the front surface of the front bracket 51. Similarly to the ridged rails 51a, the guide 51b has an arc shape with the lateral tilt axis C at the center. The radially inner wall surface of the guide 51b forms a slope 51c inclined radially inward toward the front. The front bracket 51 has a screw hole 51d on its front surface for receiving a lever shaft 53g of a lock lever 53e (described later).

Figure 18:
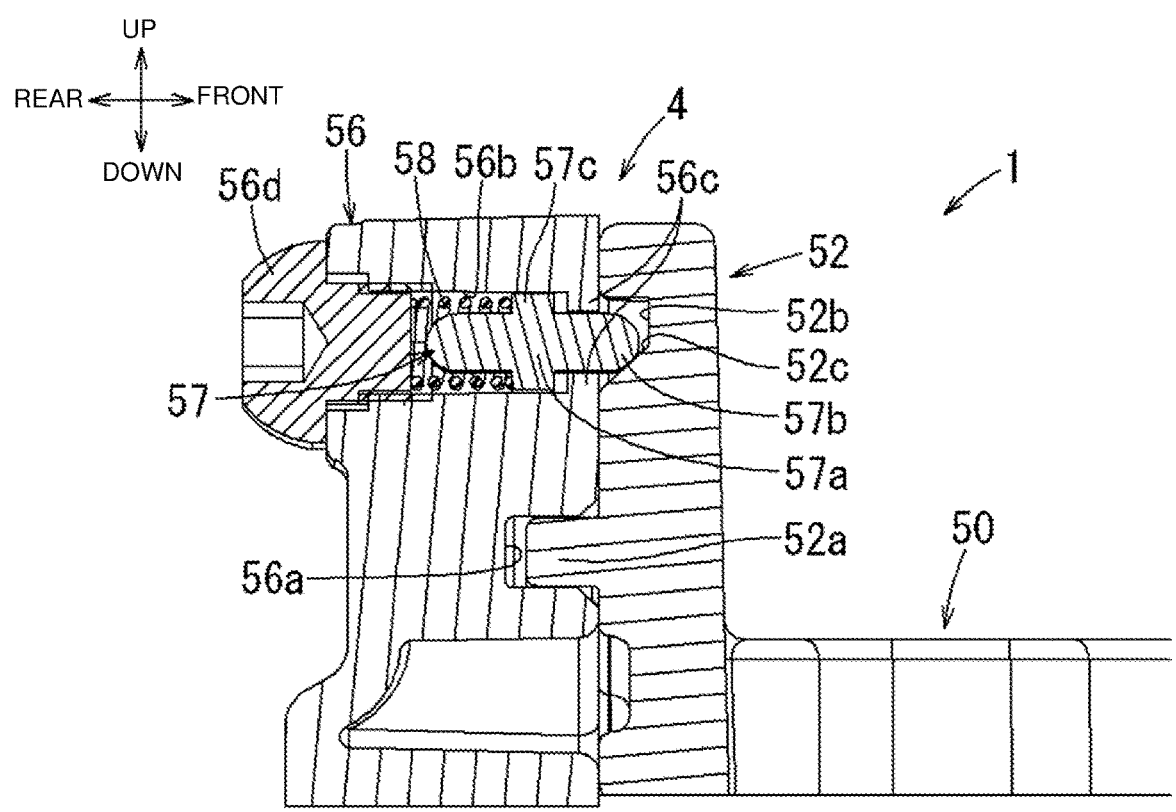
FIG. 18 is an enlarged view of part XVIII in FIG. 16.
Figure 20:
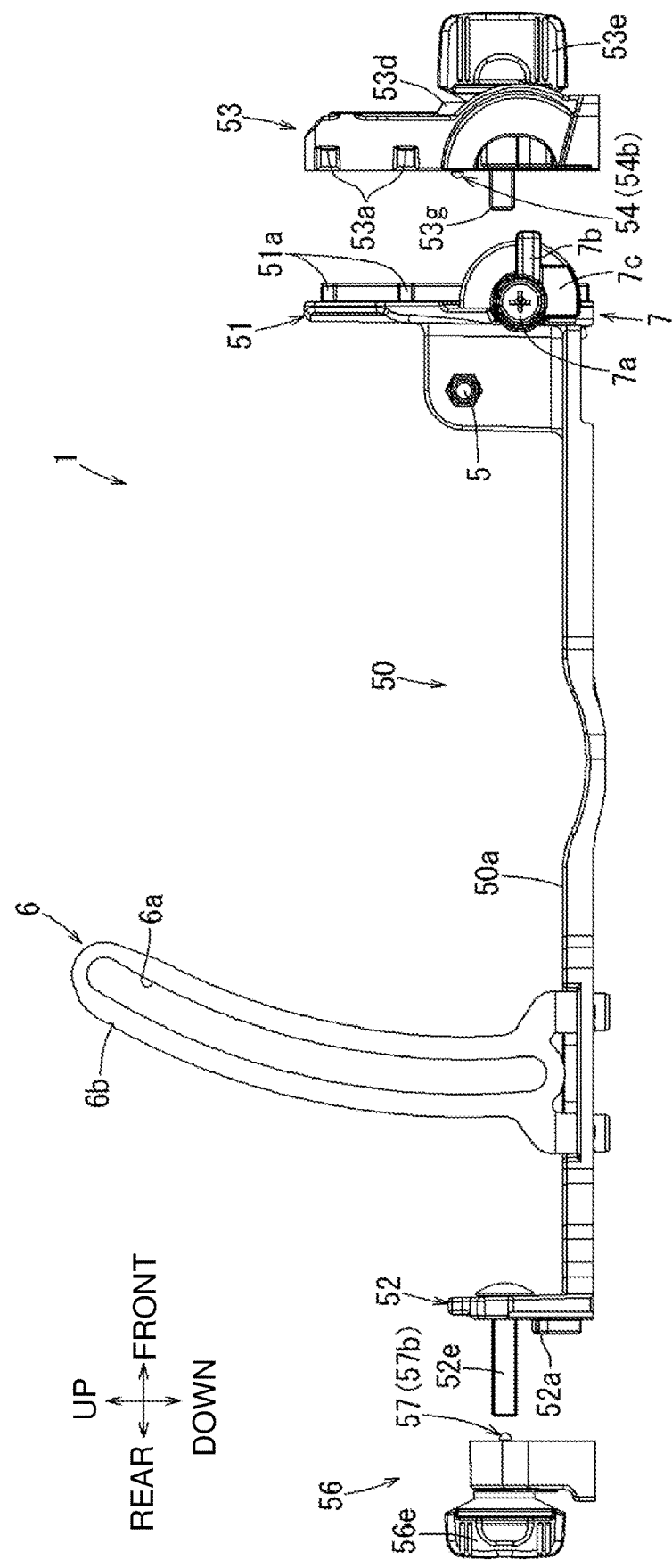
FIG. 20 is an exploded right side view of the angular plate and the body support according to the first embodiment.

As shown in FIGS. 18, 20, and 21, the rear bracket 52 includes a single ridged rail 52a on its rear surface. The ridged rail 52a extends in an arc, and protrudes rearward. The arc-shaped ridged rail 52a has the lateral tilt axis C shown in FIGS. 5 and 10 at the center. The rear bracket 52 includes a guide 52b radially outward from the ridged rail 52a. The guide 52b recedes frontward from the rear surface of the rear bracket 52. Similarly to the ridged rail 52a, the guide 52b has an arc shape with the lateral tilt axis C at the center. The radially inner wall surface of the guide 52b forms a slope 52c inclined radially inward toward the rear. The rear bracket 52 has a lever-shaft guide slot 52d. The lever-shaft guide slot 52d is an arc-shaped long hole extending through the rear bracket 52 in the front-rear direction. Similarly to the ridged rail 52a, the lever-shaft guide slot 52d has an arc shape with the lateral tilt axis C at the center. The lever-shaft guide slot 52d receives a lever shaft 52e to which a lock lever 56e (described later) is attachable. The lever shaft 52e is movable along the arc of the lever-shaft guide slot 52d.

Angular Plate 53

Figure 14:
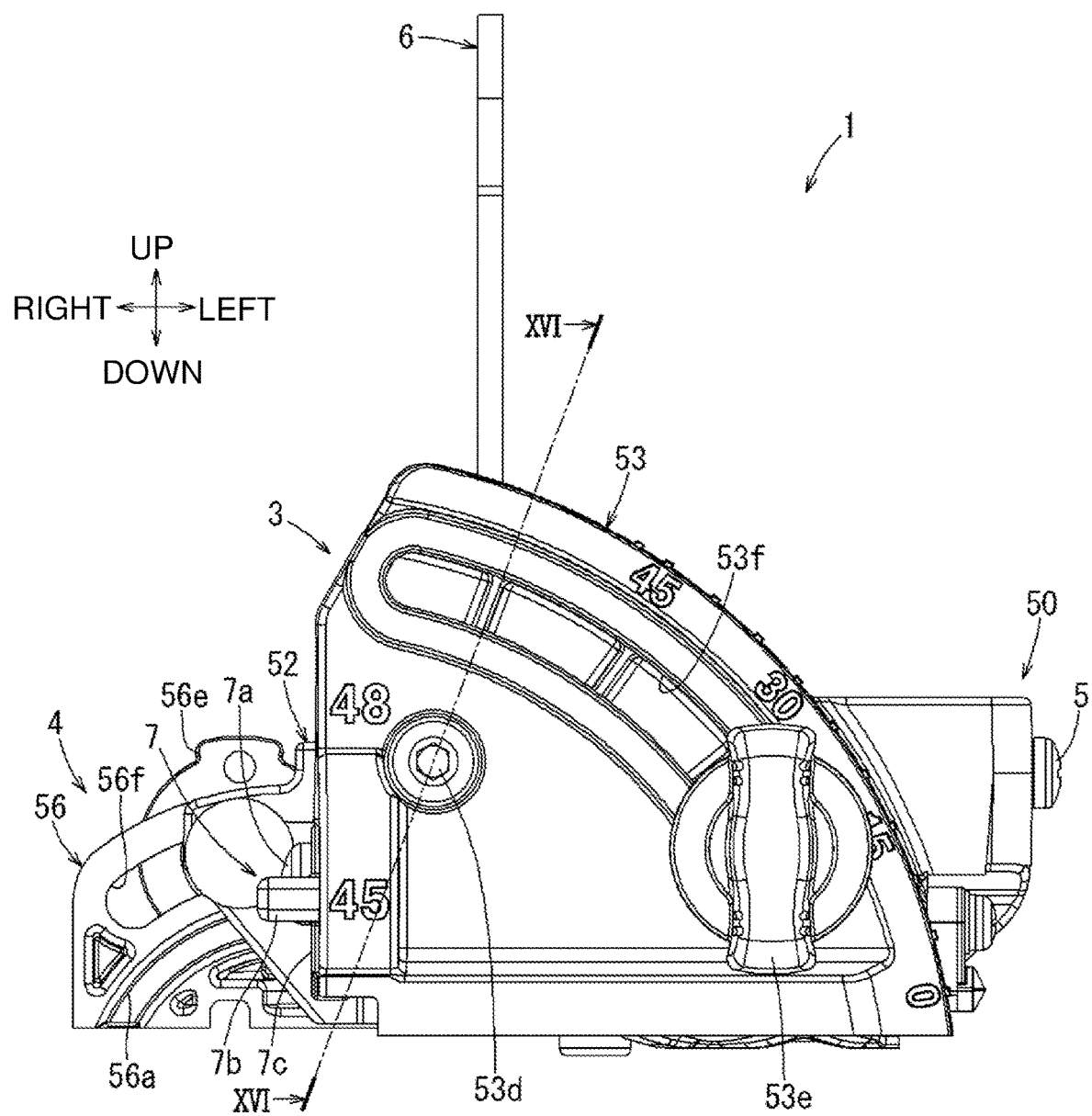
FIG. 14 is a front view of the assembly of the angular plate and the body support according to the first embodiment.

As shown in FIGS. 14 and 19, the angular plate 53 has a fan shape similar to the front bracket 51 when viewed from the front. The angular plate 53 is a die-cast member formed using a metal material, such as magnesium. The angular plate 53 and the body support 50 are formed from different metal materials to prevent the angular plate 53 and the front bracket 51 from being engaged with each other in their area of abutment. Thus, the angular plate 53 and the front bracket 51 can smoothly slide on each other.

As shown in FIGS. 17 and 19 to 21, the angular plate 53 includes two recessed rails 53a on its rear surface. The recessed rails 53a have an arc shape and recede frontward. The two recessed rails 53a are arranged in parallel in an arc with the lateral tilt axis C shown in FIGS. 4 and 9 at the center. The two recessed rails 53a and the two ridged rails 51a on the front bracket 51 are engaged with each other. The recessed rails 53a and the ridged rails 51a are each slidably engaged with each other with an appropriate clearance (play) between the rails 53a and 51a. The angular plate 53 includes a reception hole 53b, which receives a protrusion, radially inward from the radially inner recessed rail 53a. The reception hole 53b extends through the angular plate 53 in the front-rear direction. The reception hole 53b faces the guide 51b, or specifically, the slope 51c on the front bracket 51. The reception hole 53b facing the front bracket 51 includes, at its rear end, a stopper 53c with a smaller hole diameter. The reception hole 53b has an internal thread in its front portion to receive a screw 53d (described later).

Figure 17:
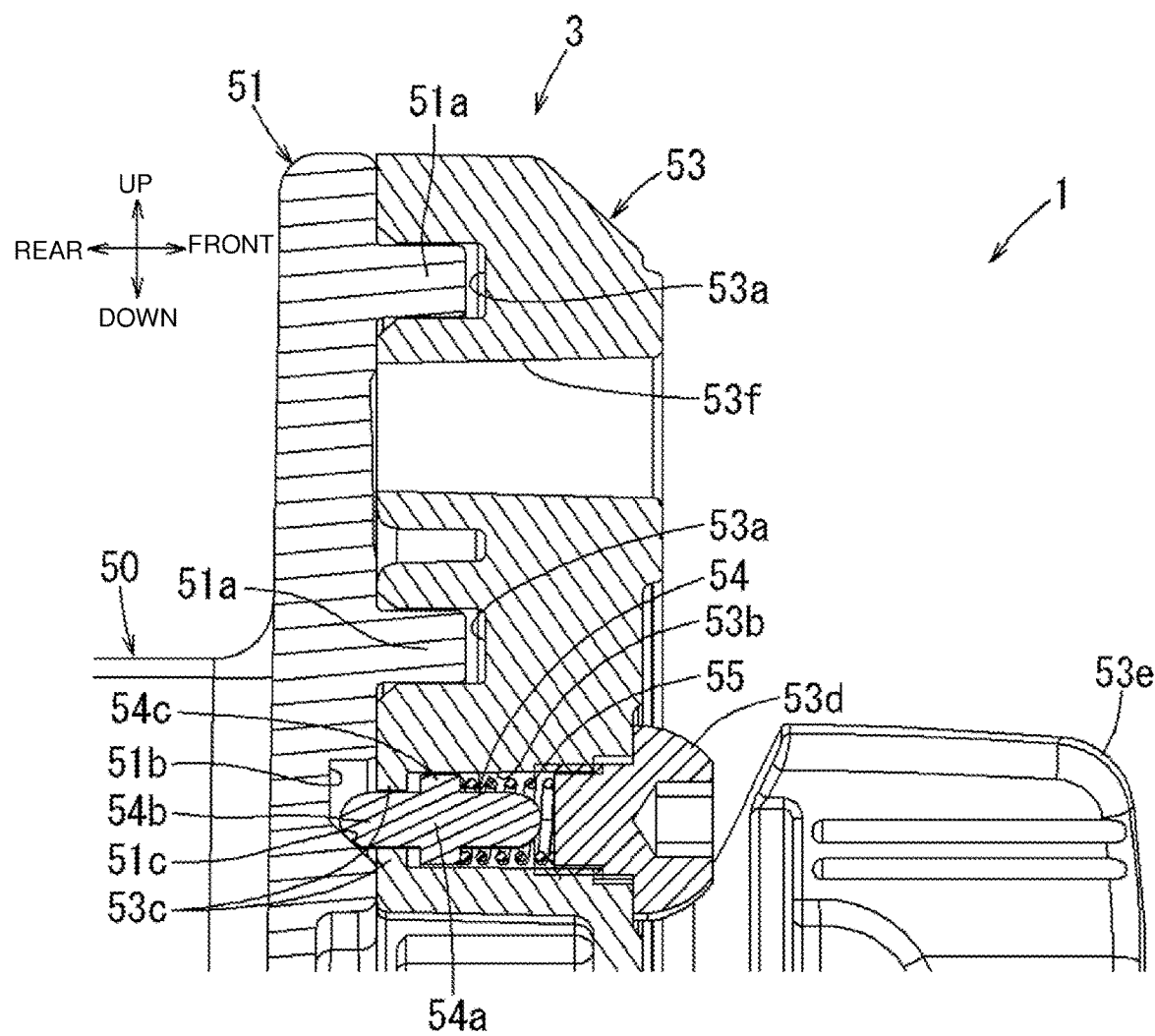
FIG. 17 is an enlarged view of part XVII in FIG. 16.

As shown in FIG. 17, the reception hole 53b receives a protrusion 54 and a compression spring 55. The protrusion 54 includes a columnar shaft 54a, a flange 54c, and an abutting portion 54b. The flange 54c is substantially in the middle of the shaft 54a, and stretches radially outward. The abutting portion 54b is at the rear end. The abutting portion 54b is semi-spherical. The protrusion 54 is an integrally molded part formed using a self-lubricating material, such as a nylon resin.

As shown in FIG. 17, the protrusion 54 is received in the reception hole 53b from the front of the reception hole 53b with the abutting portion 54b rearward. The abutting portion 54b can protrude rearward from the rear end of the reception hole 53b. The flange 54c cannot pass through the stopper 53c. The compression spring 55 is received in the reception hole 53b to be positioned in front of the flange 54c. With the protrusion 54 and the compression spring 55 received, the front end of the reception hole 53b is closed with a screw 53d. Thus, the protrusion 54 and the compression spring 55 are attached to the angular plate 53 in a manner unremovable from the reception hole 53b. The flange 54c is urged rearward by the compression spring 55. Thus, the abutting portion 54b is urged rearward to protrude from the rear end of the reception hole 53b.

As shown in FIG. 19, the angular plate 53 has a lever-shaft guide slot 53f. The lever-shaft guide slot 53f is an arc-shaped long hole extending through the angular plate 53 in the front-rear direction. The lever-shaft guide slot 53f receives the lever shaft 53g of the lock lever 53e. The distal end of the lever shaft 53g is received in the screw hole 51d in the front bracket 51. The lock lever 53e is rotatable about the lever shaft 53g. When the lock lever 53e is rotated in the direction to loosen the lever shaft 53g from the screw hole 51d, the front bracket 51 and the angular plate 53 can slide on each other along the arc of the ridged rails 51a and the recessed rails 53a. When the lock lever 53e is rotated in the direction to tighten the lever shaft 53g into the screw hole 51d, the front bracket 51 and the angular plate 53 are locked to each other at a predetermined lateral tilt angle. This structure enables tilt cutting with the blade 11 tilting at a predetermined tilt angle with respect to the lower surface of the base 2 as shown in, for example, FIG. 9.

As shown in FIG. 17, when the ridged rails 51a and the recessed rails 53a are engaged with each other, the abutting portion 54b of the protrusion 54 urged rearward abuts against the slope 51c. The abutting portion 54b abutting against the slope 51c allows the protrusion 54 to serve as an elastic buffer between the front bracket 51 and the angular plate 53. The slope 51c is urged by the abutting portion 54b rearward and radially inward with the lateral tilt axis C shown in FIG. 4 at the center. This structure reduces the clearances between the radially inner surfaces of the ridged rails 51a and the radially inner surfaces of the recessed rails 53a particularly under the radial urging force, and reduces rattling caused particularly by the radial clearances between the ridged rails 51a and the recessed rails 53a.

Angular Plate 56

Figure 15:
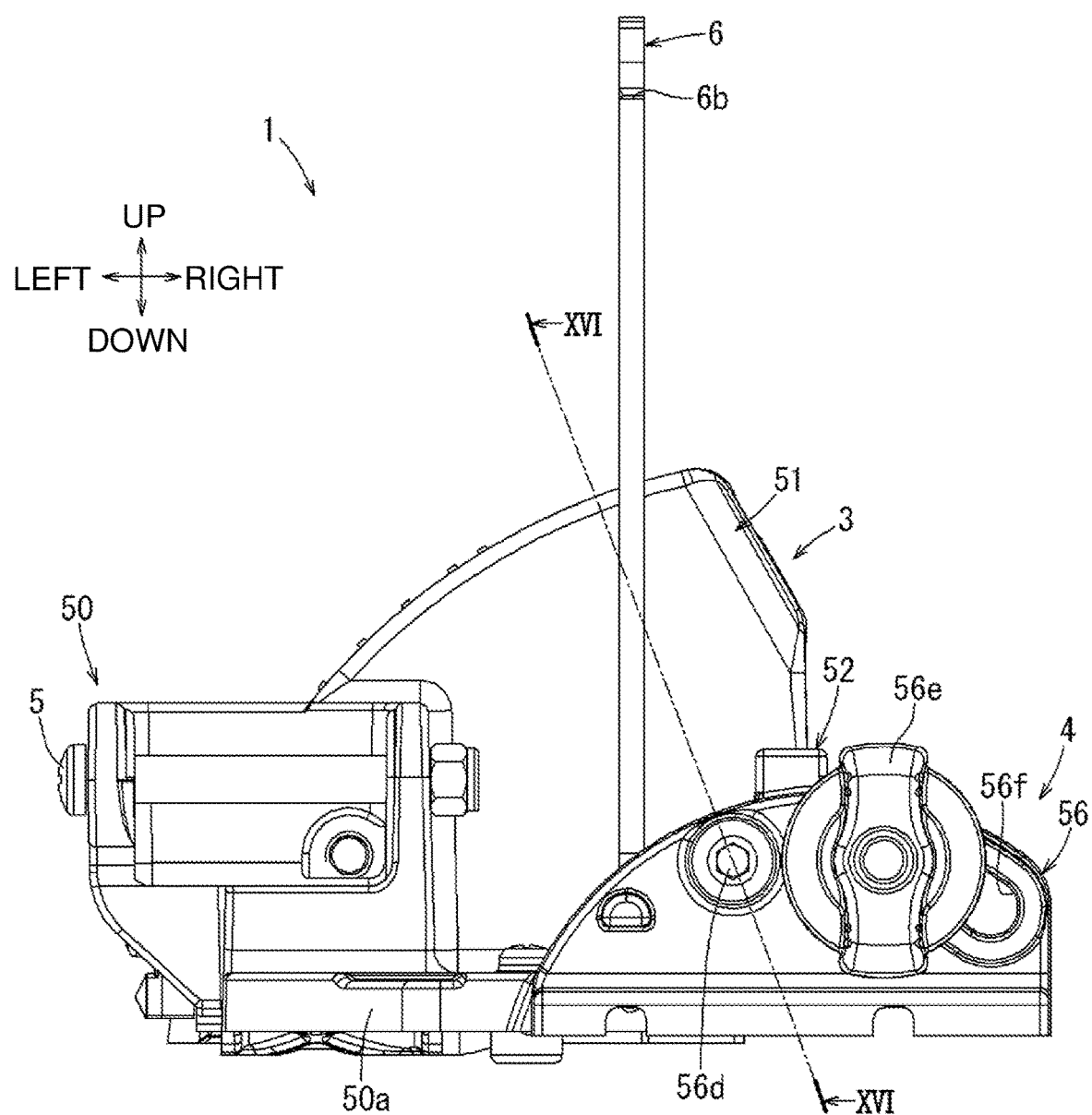
FIG. 15 is a rear view of the assembly of the angular plate and the body support according to the first embodiment.

As shown in FIGS. 15 and 19, the angular plate 56 has a fan shape similar to the rear bracket 52 when viewed from the rear. The angular plate 56 is a die-cast member formed using a metal material, such as magnesium. The angular plate 56 and the body support 50 are formed from different metal materials to prevent engagement with each other in their area of abutment. Thus, the angular plate 56 and the rear bracket 52 can smoothly slide on each other.

As shown in FIGS. 18, 20, and 21, the angular plate 56 includes a single recessed rail 56a on its front surface. The recessed rail 56a has an arc shape and recedes rearward. The recessed rail 56a extends in an arc with the lateral tilt axis C shown in FIGS. 5 and 10 at the center. The recessed rail 56a and the ridged rail 52a on the rear bracket 52 are engaged with each other. The recessed rail 56a and the ridged rail 52a are slidably engaged with each other with an appropriate clearance (play) between the rails 56a and 52a. The angular plate 56 includes a reception hole 56b, which receives a protrusion, radially outward from the recessed rail 56a. The reception hole 56b extends through the angular plate 56 in the front-rear direction. The reception hole 56b faces the guide 52b, or specifically, the slope 52c on the rear bracket 52. The reception hole 56b facing the rear bracket 52 includes, at its front end, a stopper 56c with a smaller hole diameter. The reception hole 56b has an internal thread on its rear portion to receive a screw 56d (described later).

As shown in FIG. 18, the reception hole 56b receives a protrusion 57 and a compression spring 58. Similarly to the protrusion 54, the protrusion 57 includes a shaft 57a, an abutting portion 57b, and a flange 57c. The abutting portion 57b is semi-spherical. The protrusion 57 is an integrally molded part formed using a self-lubricating material, such as a nylon resin.

As shown in FIG. 18, the protrusion 57 is received in the reception hole 56b from the rear of the reception hole 56b with the abutting portion 57b frontward. The abutting portion 57b can protrude frontward from the front end of the reception hole 56b. The flange 57c cannot pass through the stopper 56c. The compression spring 58 is received in the reception hole 56b to be positioned behind the flange 57c. With the protrusion 57 and the compression spring 58 received, the rear end of the reception hole 56b is closed with a screw 56d. Thus, the protrusion 57 and the compression spring 58 are attached to the angular plate 56 in a manner unremovable from the reception hole 56b. The flange 57c is urged frontward by the compression spring 58. Thus, the abutting portion 57b is urged frontward to protrude from the front end of the reception hole 56b.

As shown in FIG. 19, the angular plate 56 has a lever-shaft guide slot 56f. The lever-shaft guide slot 56f is an arc-shaped long hole extending through the angular plate 56 in the front-rear direction. Similarly to the recessed rail 56a, the lever-shaft guide slot 56f has an arc shape with the lateral tilt axis C shown in FIG. 5 at the center. The lever-shaft guide slot 56f receives the lever shaft 52e of the rear bracket 52. The lever shaft 52e has an external thread on its rear end, to which the lock lever 56e is mounted. The lock lever 56e is rotatable about the lever shaft 52e. When the lock lever 56e is rotated in the direction to loosen the lock lever 56e from the lever shaft 52e, the rear bracket 52 and the angular plate 56 can slide on each other along the arcs of the ridged rail 52a and the recessed rail 56a. When the lock lever 56e is rotated in the direction to tighten the lock lever 56e of the lever shaft 52e, the rear bracket 52 and the angular plate 56 are locked to each other at a predetermined lateral tilt angle. This structure enables tilt cutting with the blade 11 tilting at a predetermined tilt angle with respect to the lower surface of the base 2 as shown in, for example, FIG. 10.

As shown in FIG. 18, when the ridged rail 52a and the recessed rail 56a are engaged with each other, the abutting portion 57b of the protrusion 57 urged frontward abuts against the slope 52c. The abutting portion 57b abutting against the slope 52c allows the protrusion 57 to serve as an elastic buffer between the rear bracket 52 and the angular plate 56. The slope 52c is urged by the abutting portion 57b frontward and radially inward with the lateral tilt axis C shown in FIG. 5 at the center. This structure reduces the clearance between the radially inner surface of the ridged rail 52a and the radially inner surface of the recessed rail 56a particularly under the radial urging force, and reduces rattling caused particularly by the radial clearance between the ridged rail 52a and the recessed rail 56a.

The portable machining apparatus 1 according to the present embodiment machines the workpiece W by moving in the longitudinal direction of the long gauge 60 placed on the upper surface of the workpiece W, with the base 2 placed on the upper surface of the long gauge 60. The portable machining apparatus 1 includes the body 10 including a blade 11 for machining the workpiece W, and the angular plates 53 and 56 on the base 2 to support the body 10 in a tiltable manner. The angular plates 53 and 56 are die-cast members.

The angular plates 53 and 56 thus have higher rigidity. This increases the stability in tilting the body 10 with respect to the base 2 and in machining a workpiece with the tilting body 10, thus providing higher operability. The externally visible angular plates 53 and 56 on the front and rear of the portable machining apparatus 1 are die-cast members to provide quality appearance and accurate appearance.

The body support 50 is located between the body 10 and the base 2 to be engaged with the angular plates 53 and 56. The angular plate 53 includes the protrusion 54, which protrudes from the rear end of the angular plate 53. The angular plate 56 includes the protrusion 57, which protrudes from the front end of the angular plate 56. The front bracket 51 engaged with the angular plate 53 includes the arc-shaped guide 51b on its front surface. The rear bracket 52 engaged with the angular plate 56 includes the arc-shaped guide 52b on its rear surface. The abutting portion 54b of the protrusion 54 is slidable on the slope 51c on the guide 51b while being engaged with the slope 51c. The abutting portion 57b of the protrusion 57 is slidable on the slope 52c on the guide 52b while being engaged with the slope 52c.

The die-cast angular plate 53 or 56 abutting against the front bracket 51 or the rear bracket 52 by a larger area may be engaged with the front bracket 51 or the rear bracket 52 due to the properties of metal and become less smoothly slidable on the bracket. In response to this, clearances are left across the areas of engagement between the recessed rails 53a on the angular plate 53 and the ridged rails 51a on the front bracket 51, and the clearances are reduced by the abutting portion 54b abutting against the slope 51c to reduce rattling. In addition, a clearance is left across the area of engagement between the recessed rail 56a on the angular plate 56 and the ridged rail 52a on the rear bracket 52, and the clearance is reduced by the abutting portion 57b abutting against the slope 52c to reduce rattling. This structure reduces rattling while the front bracket 51 and the angular plate 53 remain slidable on each other and the rear bracket 52 and the angular plate 56 remain slidable on each other.

Each of the protrusions 54 and 57 is an integrally molded part.

Thus, the protrusions 54 and 57 can have more flexibly designed shapes. The protrusions 54 and 57 can thus adjust the areas of abutment between the abutting portion 54b or 57b and the slope 51c or 52c and can easily adjust the frictional force of the abutting portion 54b or 57b during sliding.

The protrusion 54 or 57 is urged by the compression spring 55 or 58 toward the guide 51b or 52b, or specifically, toward the slope 51c or 52c.

Thus, the spring elastically absorbs rattling in portions of the ridged rails 51a and 52a engaged with the recessed rails 53a and 56a, allowing the front bracket 51 or the rear bracket 52 and the angular plate 53 or 56 to more smoothly slide on each other. In particular, this structure reduces the clearances between the radially inner surface of the ridged rails 51a or 52a and the radially inner surface of the recessed rails 53a or 56a under the radial urging force with the lateral tilt axis C at the center. This reduces rattling caused particularly by the radial clearances between the ridged rails 51a or 52a and the recessed rails 53a or 56a.

The abutting portions 54b and 57b are semi-spherical. More specifically, the abutting portions 54b and 57b each have a circular cross section taken perpendicular to the axis of the shaft 54a or 57a. The abutting portions 54b and 57b also taper (have a circular cross section with a smaller diameter) toward their distal ends.

Under, for example, a large frictional force between the abutting portion 54b or 57b and the slope 51c or 52c, the abutting point of the abutting portion 54b or 57b on the slope 51c or 52c can easily be shifted by the protrusion 54 or 57 rotating about the axis of the shaft 54a or 57a. Thus, the front bracket 51 and the angular plate 53 remain slidable on each other, and the rear bracket 52 and the angular plate 56 remain slidable on each other.

Second Embodiment

A portable machining apparatus 70 according to a second embodiment will be described with reference to FIGS. 22 and 23. The portable machining apparatus 70 according to the present embodiment includes a body support 71 and a protrusion 73, in place of the body support 50 and the protrusion 54 according to the first embodiment. Hereafter, the components different from those of the portable machining apparatus 1 according to the first embodiment will be described in detail.

Figure 22:
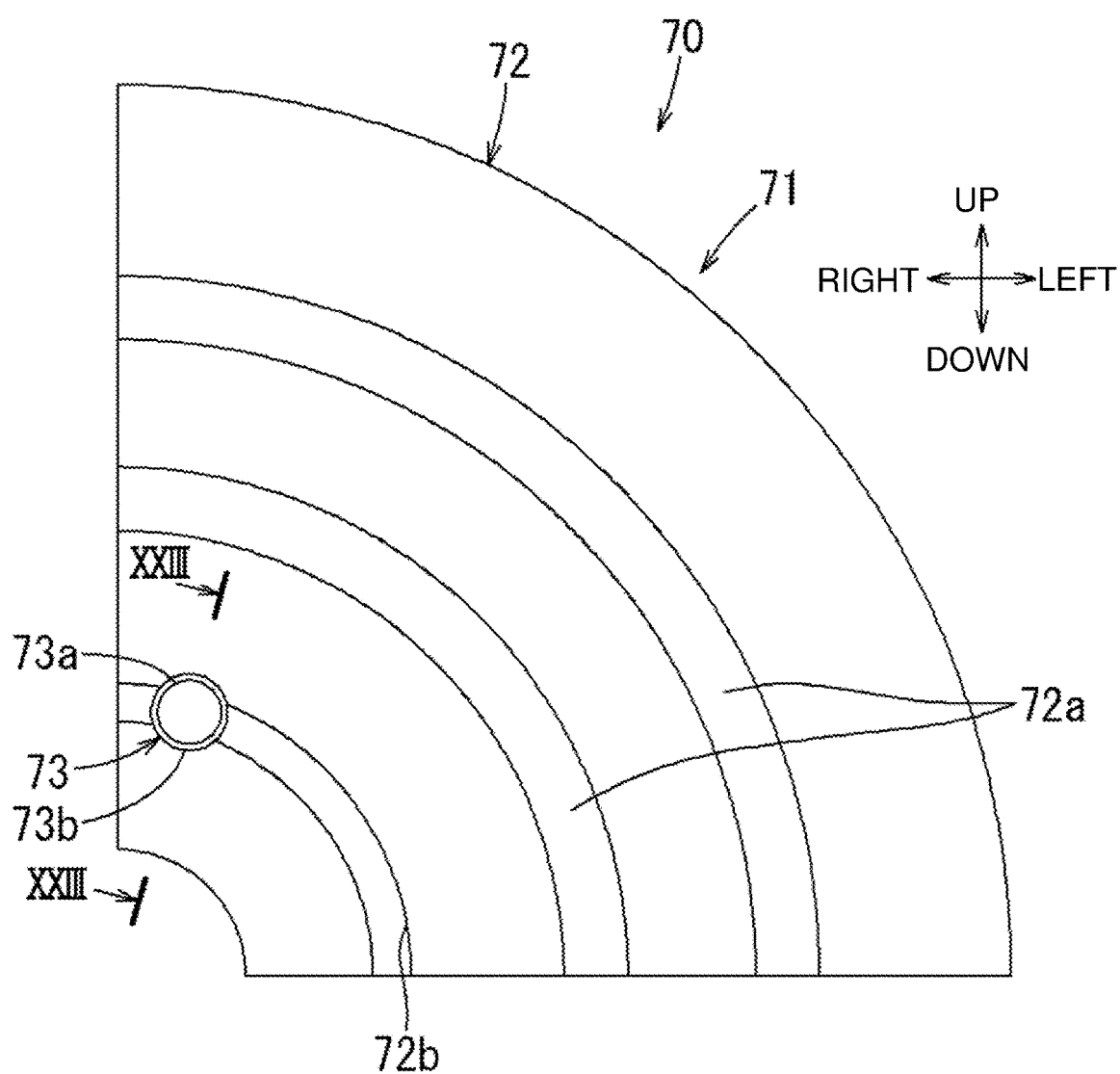
FIG. 22 is a front view of a protrusion and a body support according to a second embodiment.

As shown in FIG. 22, similarly to the front bracket 51 shown in FIG. 19, a front bracket 72 on the body support 71 has a fan shape stretching upward. Similarly to the ridged rails 51a on the front bracket 51, the front bracket 72 includes two ridged rails 72a on its front surface. The ridged rails 72a extend in an arc, and protrude forward. The front bracket 72 includes a guide 72b radially inward from the radially inner ridged rail 72a. The guide 72b recedes rearward from the front surface of the front bracket 72. As shown in FIG. 23, the guide 72b has a substantially rectangular cross section taken perpendicular to its extending direction. The two ridged rails 72a and the guide 72b are arranged in parallel in an arc with the lateral tilt axis C shown in FIG. 4 at the center.

The protrusion 73 is located on a die-cast angular plate engaged with the front bracket 72. The protrusion 73 is an integrally molded part formed using a self-lubricating material, such as a nylon resin. The protrusion 73 has an abutting portion with a shape different from that of the abutting portion of the protrusion 54 shown in FIG. 17. As shown in FIGS. 22 and 23, an abutting portion 73b of the protrusion 73 at the rear end of a shaft 73a has a conical shape having the vertex at the rear end.

Figure 23:
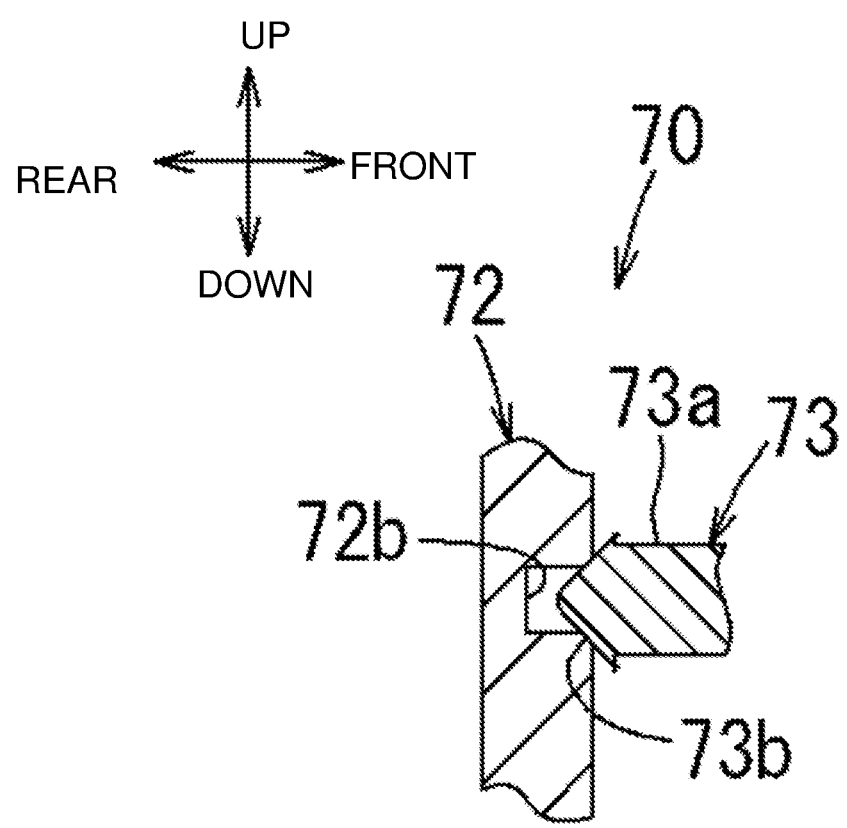
FIG. 23 is a cross-sectional view taken along line XXIII-XXIII in FIG. 22, as viewed in the direction indicated by arrows.

As shown in FIG. 23, when the front bracket 72 is engaged with the angular plate, the abutting portion 73b of the protrusion 73 urged rearward by a spring abuts against the guide 72b. More specifically, the cone surface of the abutting portion 73b abuts against the front of the guide 72b. Thus, the protrusion 73 serves as an elastic buffer between the front bracket 72 and the angular plate. The cone surface of the abutting portion 73b tilts with respect to the axial direction of the shaft 73a. Thus, the front portion of the guide 72b is urged by the abutting portion 73b rearward and in the radial direction of the guide 72b. The radial clearances between the ridged rails 72a and the recessed rails on the angular plate engaged with the ridged rails 72a are reduced particularly under the radial urging force applied to the guide 72b from the cone surface of the abutting portion 73b. This reduces rattling caused by the clearances. Although not specifically shown, the rear bracket on the body support 71 also includes a guide similar to the guide 72b, and a protrusion that abuts against the guide on the rear bracket, similar to the protrusion 73.

In the portable machining apparatus 70 according to the present embodiment, similarly to the portable machining apparatus 1 according to the first embodiment, the abutting portion 73b of the protrusion 73 on the die-cast angular plate is slidable on the guide 72b on the front bracket 72 while being engaged with the guide 72b. The protrusion 73 is urged by a spring toward the guide 72b.

Thus, the spring elastically absorbs rattling caused by clearances in portions of the ridged rails 72a on the front bracket 72 engaged with the recessed rails on the angular plate, allowing the front bracket 72 and the angular plate to more smoothly slide on each other. In particular, this structure reduces the radial clearances between the ridged rails 72a and the recessed rails engaged with the ridged rails 72a under the radial urging force applied to the guide 72b. This reduces rattling caused by the clearances.

The protrusion 73 is an integrally molded part. The abutting portion 73b has a conical shape having the vertex at the rear end. More specifically, the abutting portion 73b has a circular cross section taken perpendicular to the axis of the shaft 73a and tapers (has a circular cross section with a smaller diameter) toward the rear end.

Thus, the protrusion 73 can have more flexibly designed shapes. The abutting portion 73b can thus adjust the area of abutment between the abutting portion 73b and the guide 72b and can easily adjust the frictional force of the abutting portion 73b during sliding. Under, for example, a large frictional force between the abutting portion 73b and the guide 72b, the abutting point of the abutting portion 73b on the guide 72b can easily be shifted by the protrusion 73 rotating about the axis of the shaft 73a. Thus, the front bracket 72 and the angular plate remain slidable on each other.

Third Embodiment

A portable machining apparatus 80 according to a third embodiment will now be described with reference to FIGS. 24 and 25. The portable machining apparatus 80 according to the present embodiment includes a body support 81 and a protrusion 83, in place of the body support 50 and the protrusion 54 according to the first embodiment. Hereafter, the components different from those of the portable machining apparatus 1 according to the first embodiment will be described in detail.

Figure 24:
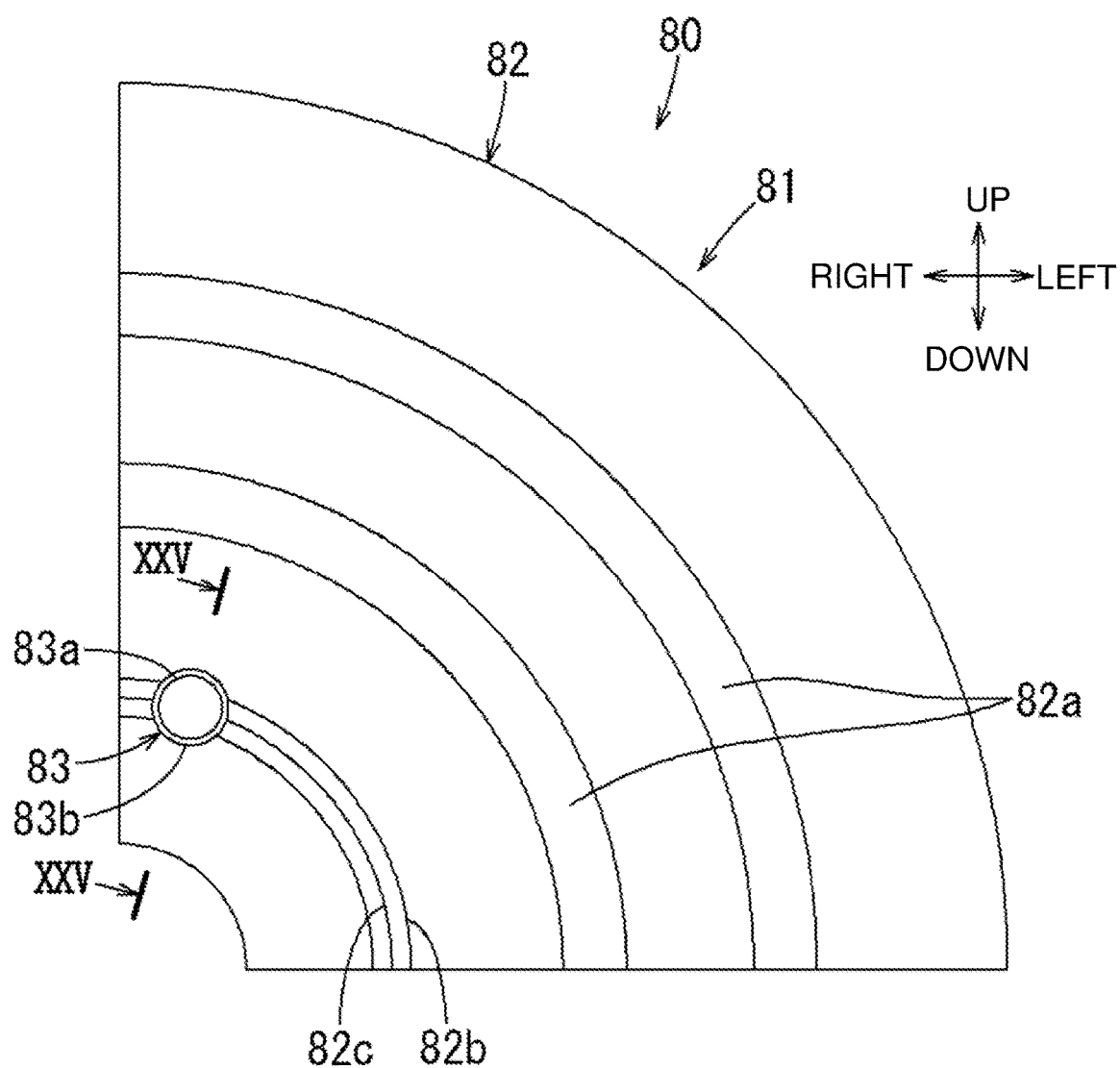
FIG. 24 is a front view of a protrusion and a body support according to a third embodiment.

As shown in FIG. 24, similarly to the front bracket 51 shown in FIG. 19, a front bracket 82 on the body support 81 has a fan shape stretching upward. Similarly to the ridged rails 51a on the front bracket 51, the front bracket 82 includes two ridged rails 82a on its front surface. The ridged rails 82a extend in an arc, and protrude forward. The front bracket 82 includes a guide 82b radially inward from the radially inner ridged rail 82a. The guide 82b protrudes frontward from the front surface of the front bracket 82. As shown in FIG. 25, the guide 82b has a substantially inverted-V cross section taken perpendicular to its extending direction, and has a vertex 82c at the front end. The two ridged rails 82a and the guide 82b are arranged in parallel in an arc with the lateral tilt axis C shown in FIG. 4 at the center.

The protrusion 83 is located on a die-cast angular plate engaged with the front bracket 82. The protrusion 83 is an integrally molded part formed using a self-lubricating material, such as a nylon resin. The protrusion 83 has an abutting portion having a shape different from that of the abutting portion of the protrusion 54 shown in FIG. 17. As shown in FIGS. 24 and 25, an abutting portion 83b of the protrusion 83 at the rear end of a shaft 83a has a disk shape extending radially slightly outward from the shaft 83a. The abutting portion 83b has a V-shaped groove 83c on its rear end face. The V-shaped groove 83c extends across the diameter of the disk.

Figure 25:
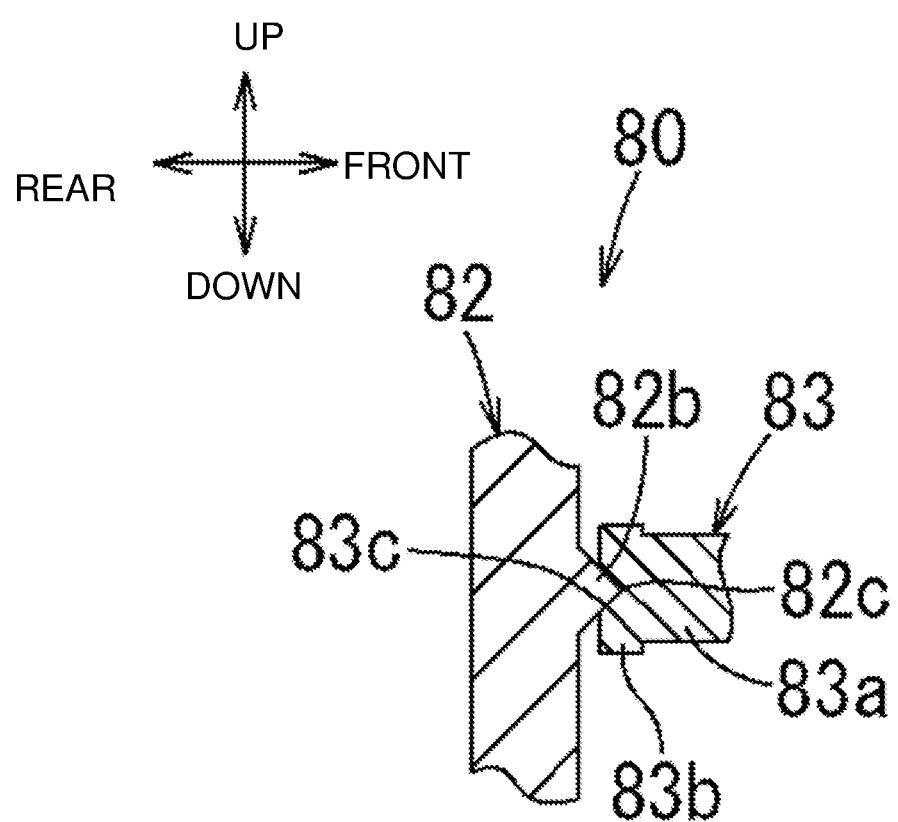
FIG. 25 is a cross-sectional view taken along line XXV-XXV in FIG. 24, as viewed in the direction indicated by arrows.

As shown in FIG. 25, when the front bracket 82 is engaged with the angular plate, the abutting portion 83b of the protrusion 83 urged rearward by a spring abuts against the guide 82b. More specifically, the groove 83c on the abutting portion 83b abuts against and in engagement with the vertex 82c of the guide 82b. Thus, the protrusion 83 serves as an elastic buffer between the front bracket 82 and the angular plate. The wall surfaces of the groove 83c and the wall surfaces of the guide 82b tilt with respect to the axial direction of the shaft 83a. Thus, the guide 82b is urged by the abutting portion 83b rearward and in the radial direction of the guide 82b. The radial clearances between the ridged rails 82a and the recessed rails on the angular plate engaged with the ridged rails 82a are reduced particularly under the radial urging force applied to the guide 82b. This reduces rattling caused by the clearances. Although not specifically shown, the rear bracket on the body support 81 also includes a guide similar to the guide 82b, and a protrusion that abuts against the guide on the rear bracket, similar to the protrusion 83.

In the portable machining apparatus 80 according to the present embodiment, similarly to the portable machining apparatus 1 according to the first embodiment, the groove 83c on the protrusion 83 on the die-cast angular plate is slidable while being engaged with the guide 82b on the front bracket 82. The protrusion 83 is urged by a spring toward the guide 82b.

Thus, the spring elastically absorbs rattling caused by clearances in portions of the ridged rails 82a on the front bracket 82 engaged with the recessed rails on the angular plate, allowing the front bracket 82 and the angular plate to more smoothly slide on each other. In particular, this structure reduces the radial clearances between the ridged rails 82a and the recessed rails engaged with the ridged rails 82a under the radial urging force applied to the guide 82b. This reduces rattling caused by the clearances.

Fourth Embodiment

A portable machining apparatus 90 according to a fourth embodiment will be described with reference to FIGS. 26 to 28. The portable machining apparatus 90 according to the present embodiment includes a body support 91 and a protrusion 93, in place of the body support 50 and the protrusion 54 according to the first embodiment. Hereafter, the components different from those of the portable machining apparatus 1 according to the first embodiment will be described in detail.

Figure 26:
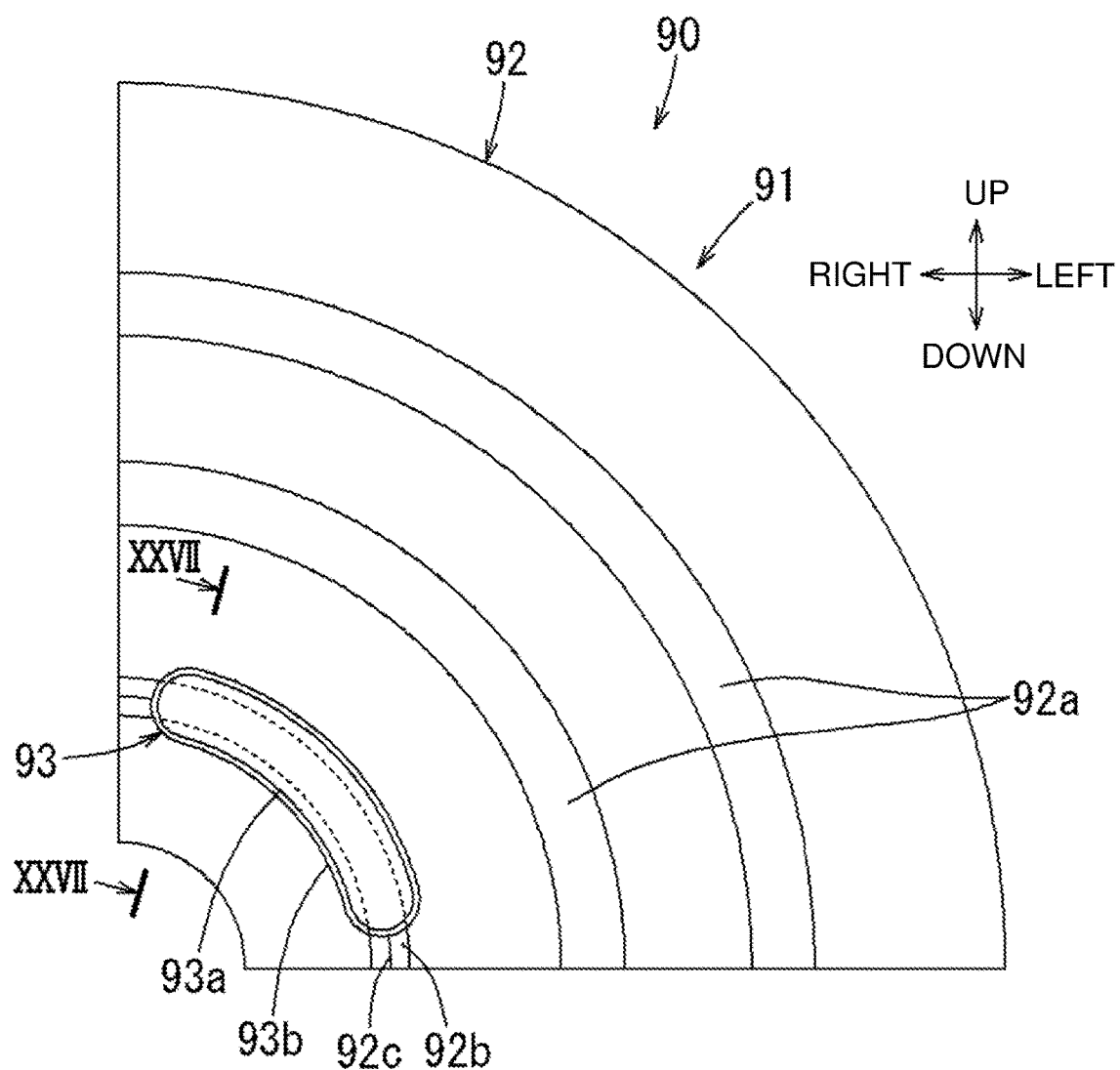
FIG. 26 is a front view of a protrusion and a body support according to a fourth embodiment.

As shown in FIG. 26, similarly to the front bracket 51 shown in FIG. 19, a front bracket 92 on the body support 91 has a fan shape stretching upward. Similarly to the ridged rails 51a on the front bracket 51, the front bracket 92 includes two ridged rails 92a on its front surface. The ridged rails 92a extend in an arc, and protrude forward. The front bracket 92 includes a guide 92b radially inward from the radially inner ridged rail 92a. The guide 92b protrudes frontward from the front surface of the front bracket 92. As shown in FIGS. 27 and 28, the guide 92b has a substantially inverted-V cross section taken perpendicular to its extending direction, and has a vertex 92c at the front end. The two ridged rails 92a and the guide 92b are arranged in parallel in an arc with the lateral tilt axis C shown in FIG. 4 at the center.

The protrusion 93 is located on a die-cast angular plate engaged with the front bracket 92. The protrusion 93 is an integrally molded part formed using a self-lubricating material, such as a nylon resin. As shown in FIGS. 26 to 28, the protrusion 93 has a wide shaft 93a with an axis extending in the front-rear direction, and having an arc shape when viewed from the front. An abutting portion 93b at the rear end of the shaft 93a has a slightly larger profile than the shaft 93a when viewed from the front. The abutting portion 93b has a groove 93c on its rear end face. The groove 93c has a V-shaped cross section taken in the axial direction of the shaft 93a. The groove 93c is curved in an arc to be engaged with the arc-shaped vertex 92c.

Figure 27:
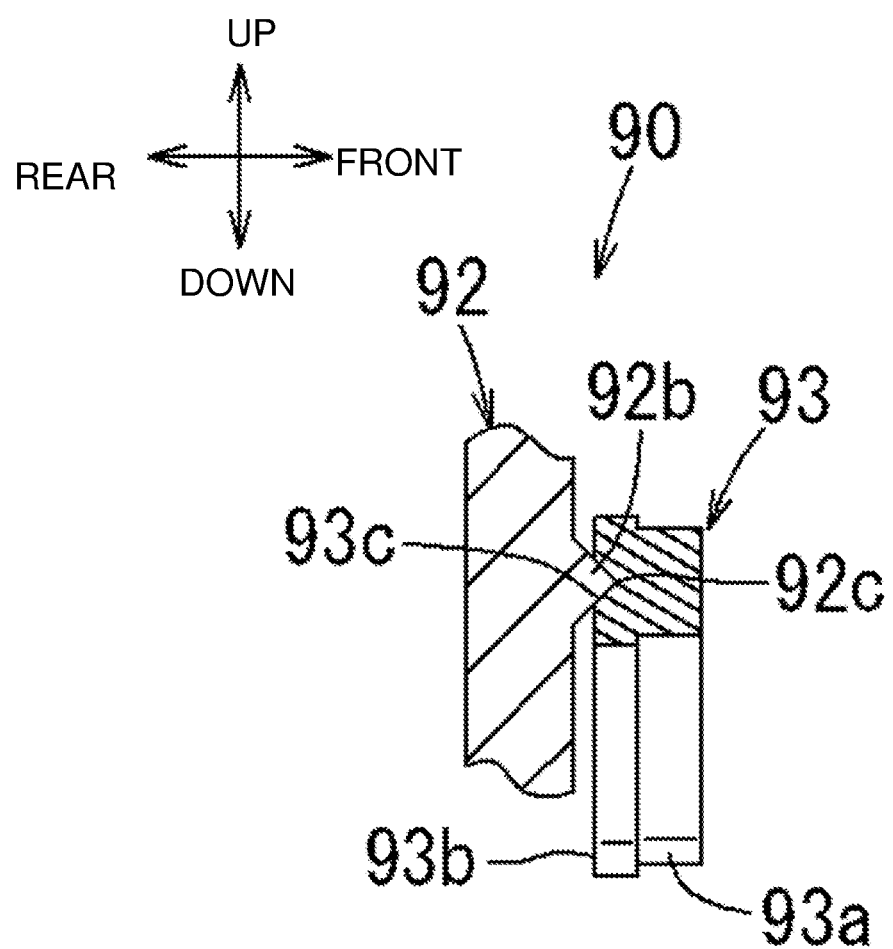
FIG. 27 is a cross-sectional view taken along line XXVII-XXVII in FIG. 26, as viewed in the direction indicated by arrows.
Figure 28:
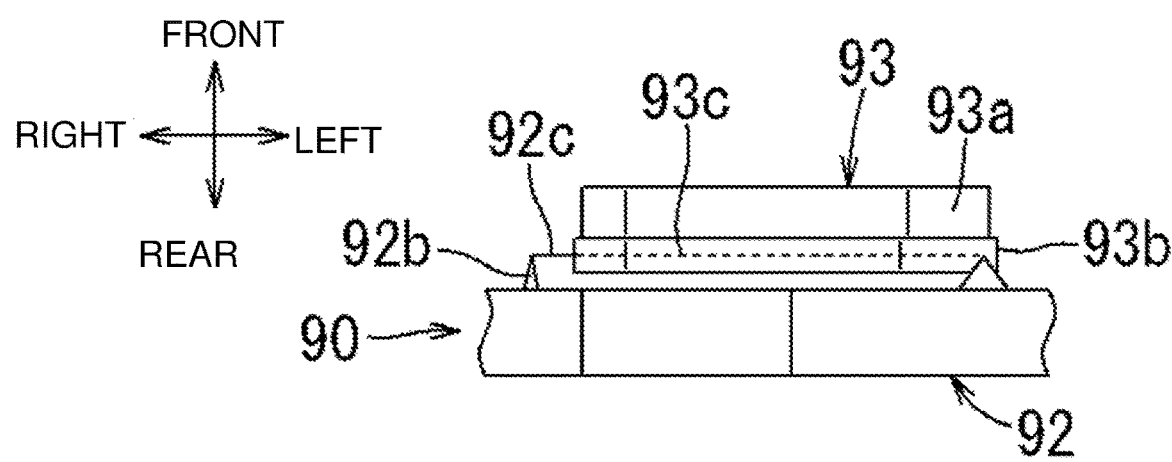
FIG. 28 is a perspective view of the protrusion and the body support according to the fourth embodiment, as viewed from below.

As shown in FIG. 27, when the front bracket 92 is engaged with the angular plate, the abutting portion 93b of the protrusion 93 urged rearward by a spring abuts against the guide 92b. More specifically, the groove 93c on the abutting portion 93b abuts against and in engagement with the vertex 92c of the guide 92b. Thus, the protrusion 93 serves as an elastic buffer between the front bracket 92 and the angular plate. The wall surfaces of the groove 93c and the wall surfaces of the guide 92b tilt with respect to the axial direction of the shaft 93a. Thus, the guide 92b is urged by the abutting portion 93b rearward and in the radial direction of the guide 92b. The radial clearances between the ridged rails 92a and the recessed rails on the angular plate engaged with the ridged rails 92a are reduced particularly under the radial urging force applied to the guide 92b. This reduces rattling caused by the clearances. Although not specifically shown, the rear bracket on the body support 91 also includes a guide similar to the guide 92b, and a protrusion that abuts against the guide on the rear bracket, similar to the protrusion 93.

In the portable machining apparatus 90 according to the present embodiment, similarly to the portable machining apparatus 1 according to the first embodiment, the abutting portion 93b of the protrusion 93 on the die-cast angular plate is slidable on the guide 92b on the front bracket 92 while being engaged with the guide 92b. The protrusion 93 is urged by a spring toward the guide 92b.

Thus, the spring elastically absorbs rattling caused by clearances in portions of the ridged rails 92a on the front bracket 92 engaged with the recessed rails on the angular plate, allowing the front bracket 92 and the angular plate to more smoothly slide on each other. In particular, this structure reduces the radial clearances between the ridged rails 92a and the recessed rails engaged with the ridged rails 92a under the radial urging force applied to the guide 92b. This reduces rattling caused by the clearances.

The portable machining apparatuses 1, 70, 80, and 90 according to the first to fourth embodiments can be modified in various manners. Although a portable machining apparatus referred to as a plunge circular saw is described by way of example, the present invention is applicable to another device such as a cutter, a jigsaw, or a router as a portable machining apparatus. An aluminum die-cast body support and a magnesium die-cast angular plate are described by way of example. Instead, a magnesium die-cast body support and an aluminum die-cast angular plate may be used, or the angular plate or the body support may be a die-cast member formed using another metal material. In the above example, the bracket on the body support includes a ridged rail, and the angular plate includes a recessed rail. Instead, the bracket may include a recessed rail, and the angular plate may include a ridged rail. In the above example, the front tilting support 3 includes two ridged rails and two recessed rails, and the rear tilting support 4 includes a single ridged rail and a single recessed rail. However, the number of ridged rails and the number of recessed rails are not limited to those in the above example, and may be changed as appropriate.

The bracket on the body support may include a protrusion, the angular plate may include a guide, and the protrusion may be urged toward the angular plate. The shapes of the protrusions and the guides are not limited to those in the above example, and may be modified as appropriate to, for example, a protrusion including a rounded abutting portion. The urging force of the protrusion 54 or 57 applied from the compression spring 55 or 58 may be adjusted by changing the amount by which the screw 53d or 56d is tightened. A spring that urges the protrusion is not limited to any of the compression springs 55 and 58 described above, and may be an elastic member formed from, for example, a tension spring or rubber. The protrusion and the guide on the front tilting support 3 may have shapes different from those of the protrusion and the guide on the rear tilting support 4. For example, the protrusion 54 and the guide 51b according to the first embodiment may be used as the protrusion and the guide on the front tilting support 3. The protrusion 73 and the guide 72b according to the second embodiment may be used as the protrusion and the guide on the rear tilting support 4. As in the above examples, two or more of the embodiments may be combined as appropriate.

REFERENCE SIGNS LIST 1 portable machining apparatus (first embodiment)
2 base
2a window
2b guide groove
2e setscrew
3 front tilting support
4 rear tilting support
5 vertical swing support shaft
6 depth guide 6a bolt guide slot
6b graduation
6c fixing bolt
6d fixing lever
7 maximum-tilt-angle switching mechanism
7a shaft
7b operable member
7c base contact portion
10 body
11 blade
12 outer flange
13 inner flange
14 fixing bolt
15 stationary cover
15a solid-white arrow (indicating rotation direction of blade)
15b dust collection nozzle
15c depth scale
16 movable cover
16a open-close lever
20 motor housing
20a air inlet
21 electric motor
21a motor shaft
21b stator
21c rotor
21d sensor board
21e, 21f bearing
22 cooling fan
23 controller
25 gear housing
25a air outlet
26 driver gear
27 driven gear
28 spindle
28a, 28b bearing
30 handle (main handle)
31 grip
31a elastomer resin layer
32 switch lever
33 lock-off button
34 adaptor socket
35 communication adaptor
35a adaptor switch
36 front handle
40 battery base
41 battery mount
42 battery pack
50 body support
50a support base
50b screw contact recess
51 front bracket
51a ridged rail
51b guide
51c slope
51d screw hole
52 rear bracket
52a ridged rail
52b guide
52c slope
52d lever-shaft guide slot
52e lever shaft
53 (front) angular plate
53a recessed rail
53b reception hole
53c stopper
53d screw
53e lock lever
53f lever-shaft guide slot
53g lever shaft
54 protrusion
54a shaft
54b abutting portion
54c flange
55 compression spring
56 (rear) angular plate
56a recessed rail
56b reception hole
56c stopper
56d screw
56e lock lever
56f lever-shaft guide slot
57 protrusion
57a shaft
57b abutting portion
57c flange
58 compression spring
60 long gauge
61 guide ridge
62 slide portion
63 nonslip portion
70 portable machining apparatus (second embodiment)
71 body support
72 front bracket
72a ridged rail
72b guide
73 protrusion
73a shaft
73b abutting portion
80 portable machining apparatus (third embodiment)
81 body support
82 front bracket
82a ridged rail
82b guide
82c vertex
83 protrusion
83a shaft
83b abutting portion
83c groove
90 portable machining apparatus (fourth embodiment)
91 body support
92 front bracket
92a ridged rail
92b guide
92c vertex
93 protrusion
93a shaft
93b abutting portion
93c groove
C lateral tilt axis (virtual axis)
W workpiece

What is claimed is:

1. A portable machining apparatus placeable on a long gauge placed on an upper surface of a workpiece, the apparatus comprising:
    a base placeable on the long gauge;
    a body including a blade configured to machine the workpiece;
    an angular plate (1) fixedly attached to the base and configured to support the body in a tiltable manner in a continuous range of body positions of the body relative to the angular plate, (2) which is a die-cast plate of a first metal material, and (3) having a through hole;

a body support (1) attached to the body, (2) located between the body and the base, (3) which is a die-cast plate of a second metal material that is different from the first metal material and (4) including a guide;

a protrusion that (1) is slidably retained within the through hole, (2) slidably engages the guide, and (3) has an outwardly extending flange at substantially a middle of the protrusion along a sliding direction of the protrusion; and a spring (1) between the angular plate and the protrusion and (2) configured to urge the protrusion toward the guide, wherein:

the through hole has a stopper at a surface of the angular plate facing the body support;

the stopper has a smaller interior diameter than a rest of the through hole so that the stopper stops axial movement of the protrusion in a first direction along the sliding direction; and the guide includes a continuous recess that (1) has the shape of an arc in a plane perpendicular to the base and (2) is configured to be engaged by the protrusion in an entirety of the range of body positions.

2. The portable machining apparatus according to claim 1, wherein the protrusion is a molded part.

3. The portable machining apparatus according to claim 1, wherein
the protrusion has a distal end that engages the guide, and
the distal end includes a tapered surface that engages the guide.

4. The portable machining apparatus according to claim 3, wherein
the distal end includes a rounded exterior surface, and
the rounded exterior surface includes the tapered surface.

5. The portable machining apparatus according to claim 1, wherein the continuous recess includes a sloped surface that is inclined from a radially innermost edge of the continuous recess toward a backwall of the continuous recess.

6. The portable machining apparatus according to claim 1, wherein the angular plate includes a screw closing the through hole.

7. The portable machining apparatus according to claim 1, wherein
the spring is a compression spring, and
the flange is in contact with the spring.

8. The portable machining apparatus according to claim 1, wherein:
the arc has a lateral tilt axis at a center of the arc; and
the lateral tilt axis is below a lowermost surface of the base.

9. A portable machining apparatus placeable on a long gauge placed on an upper surface of a workpiece, the apparatus comprising:
a base placeable on the long gauge;
a body including a blade configured to machine the workpiece;

an angular plate (1) fixedly attached to the base and configured to support the body in a tiltable manner in a continuous range of body positions of the body relative to the angular plate, (2) which is a die-cast plate of a first metal material, (3) including a guide;

a body support (1) located between the body and the base (2) which is a die-cast plate of a second metal material that is different from the first metal material and (3) having a through hole;

a protrusion (1) that is slidably retained within the through hole, (2) slidably engages the guide, and (3) has an outwardly extending flange at substantially a middle of the protrusion along a sliding direction of the protrusion; and a spring (1) between the body support and the protrusion and (2) configured to urge the protrusion toward the guide, wherein:

the through hole has a stopper at a surface of the angular plate facing the body support;

the stopper has a smaller internal diameter than a rest of the through hole so that the stopper stops axial movement of the protrusion in a first direction along the sliding direction; and the guide includes a continuous recess that (1) has the shape of an arc in a plane perpendicular to the base and (2) is configured to be engaged by the protrusion in an entirety of the range of body positions.

10. The portable machining apparatus according to claim 9, wherein the protrusion is a molded part.

11. The portable machining apparatus according to claim 9, wherein
the protrusion has a distal end that engages the guide, and
the distal end includes a tapered surface that engages the guide.

12. The portable machining apparatus according to claim 11, wherein
the distal end includes a rounded exterior surface, and
the rounded exterior surface includes the tapered surface.

13. The portable machining apparatus according to claim 9, wherein the continuous recess includes a sloped surface that is inclined from a radially innermost edge of the continuous recess toward a back wall of the continuous recess.

14. The portable machining apparatus according to claim 9, wherein the angular plate includes a screw closing the through hole.

15. The portable machining apparatus according to claim 9, wherein
the spring is a compression spring, and
the flange is in contact with the spring.

16. The portable machining apparatus according to claim 9, wherein:
the arc has a lateral tilt axis at a center of the arc; and
the lateral tilt axis is below a lowermost surface of the base.

* * * * *